United States Patent [19]
Naoe et al.

[11] Patent Number: 5,718,964
[45] Date of Patent: Feb. 17, 1998

[54] MAGNETIC RECORDING MEDIUM

[75] Inventors: Koji Naoe; Kiyomi Ejiri; Hiroaki Takano, all of Kanagawa, Japan

[73] Assignee: Fuji Photo Film Co., Ltd., Kanagawa, Japan

[21] Appl. No.: 738,727

[22] Filed: Oct. 28, 1996

[30] Foreign Application Priority Data

Nov. 2, 1995 [JP] Japan .................. 7-285921

[51] Int. Cl.$^6$ .................................. G11B 5/708
[52] U.S. Cl. .................. 428/141; 428/323; 428/328; 428/694 BR; 428/694 BS; 428/694 BN; 428/694 BA
[58] Field of Search .................. 428/141, 323, 428/328, 694 BR, 694 BS, 694 BN, 694 BA, 900

[56] References Cited

U.S. PATENT DOCUMENTS

| | | | |
|---|---|---|---|
| 5,036,629 | 8/1991 | Ishikuro et al. | 51/281 R |
| 5,169,703 | 12/1992 | Miyazaki et al. | 428/141 |
| 5,573,444 | 11/1996 | Ryoke et al. | 451/28 |

*Primary Examiner*—Stevan A. Resan
*Attorney, Agent, or Firm*—G. Peter Nichols; Brinks Hofer Gilson & Lione

[57] ABSTRACT

A magnetic recording medium is disclosed, comprising a flexible non-magnetic medium having on at least one surface thereof a magnetic layer comprising a ferromagnetic powder dispersed in a binder, wherein the heights and the existing densities of the abrasive projections and the non-abrasive projections on the surface of the magnetic layer are defined in the specific ranges.

The magnetic recording medium are excellent in the electromagnetic characteristics, the magnetic head abrasion resistance, and the running durability.

18 Claims, 1 Drawing Sheet

MAGNETIC RECORDING MEDIUM

FIELD OF THE INVENTION

The present invention relates to a magnetic recording medium, and more specifically to a magnetic recording medium for high-density recording excellent in electromagnetic characteristics, reduced head abrasion, and improved running durability.

BACKGROUND OF THE INVENTION

Magnetic recording media are widely used as audio tapes, video tapes, backup memory tapes for computers, disks, etc. A magnetic recording medium is fundamentally composed of a non-magnetic support having thereon a magnetic layer comprising a ferromagnetic powder dispersed in a binder.

Fundamentally, a magnetic recording medium is required to be in high levels in the various characteristics such as electromagnetic characteristics, proper running stability, running durability, etc. In particular, with the increases of high-density recording and a high-recording rate, in a new video deck system, there is a tendency of increasing the relative speed of head/tape by the increase of the rotation speed of the cylinder of a magnetic recording video tape recorder (VTR).

Also, with shortening of the recording wavelength, it becomes necessary to reduce the spacing loss of the reproducing output and thus there is a tendency of pressing a magnetic recording tape to a magnetic head by a large pressure for keeping a good contact of them.

When a magnetic recording tape is bought into contact with a recording head at use, both the members are abraded with the increase of the frequency in use. In particular, when the contact pressure of a magnetic recording tape and a magnetic head is large and the running speed of the magnetic recording tape is high, the problem of the abrasion is serious.

However, since the abrasion is influenced by many factors in complicated relations, the cause of the abrasion has not yet been clarified.

Hitherto, for reducing the occurrences of the abrasion of magnetic recording tapes and a tape damage of a video tape during VTR running, it has generally been practiced to ensure the hardness of a magnetic recording tape by adding thereto a solid lubricant such as carbon black, etc., a liquid lubricant such as a fatty acid ester, etc., or an abrasive such as aluminum oxide, etc. In this case, however, when the amount of the solid lubricant or the abrasive added in the magnetic layer is increased, the filling factor of a magnetic powder in the magnetic layer is lowered, which results in, as the case may be, reducing the reproducing output. Also, since the liquid lubricant is influenced by the existing state thereof on the surface of the magnetic layer or in the magnetic layer, there is a problem that the liquid lubricant is greatly influenced by the dependence on the environment and the passage of time. Also, the addition of a large amount of the abrasive causes the abrasion of a magnetic head, finely changes the contact state of the magnetic recording tape and the magnetic head near the gap, caused a phenomenon of changing a reproducing envelope, and shortens the life of VTR.

Thus, it has been desired that a magnetic recording tape itself is neither abraded nor damaged by a magnetic head and running contact members of VTR, etc., and also does not abrade the magnetic head as less as possible. For attaining these desires, various investigations have been made.

For example;

1) U.S. Pat. No. 5,512,350 discloses that by reducing the average projection height of abrasives existing on the surface of a magnetic layer to 15 nm or less, the abrasion of a magnetic head and staining of the magnetic head are reduced.

2) JP-A-6-309650 (the term "JP-A" as used herein means an "unexamined published Japanese patent application") discloses that by defining the content of a lubricant, the projection heights thereof on the surface of a magnetic layer, and the existing density thereof, the running property of the magnetic recording tape is improved.

3) JP-6-12651 and JP-A-6-12652 disclose that by defining the surface roughness of a magnetic layer, the heights and the existing density of the projections on the surface of the magnetic layer, a magnetic recording tape having a good balance of the electromagnetic characteristics, the running property, and the running durability can be obtained.

However, by the conventional techniques described above, the balance of the electromagnetic characteristics, the head abrasion, and the running durability has not yet insufficient.

SUMMARY OF THE INVENTION

Accordingly, the object of the present invention is to provide a magnetic recording medium which has the good electromagnetic characteristics and improved running durability, and which abrades a magnetic head in reduced amount.

As the result of various investigations for attaining the object described above, the aforesaid object can be attained by specifically defining the surface form of a magnetic layer, particularly the heights of projections of an abrasive specified hereinafter on the surface of the magnetic layer and the existing density thereof for balancing the electromagnetic characteristics and the head abrasion with the increase of the pressing pressure at the interface of the magnetic head and the magnetic layer for meeting the increase of recent high-density recording.

That is, the object of the present invention is achieved by a magnetic recording medium comprising a flexible non-magnetic support having on at least one surface thereof a magnetic layer comprising a ferromagnetic powder dispersed in a binder resin, wherein said magnetic layer contains therein an abrasive, projections composed of the abrasive (abrasive projections) and projections (non-abrasive projections) of other component(s) than the abrasive are distributed on the surface of said magnetic layer, when the existing density of the abrasive projections is Kt, in the abrasive projections, the existing density of the abrasive projections having the heights from the surface of the magnetic layer of from 10 nm to 30 nm is K10, in the non-abrasive projections, the existing density of the non-abrasive projections having the heights from the surface of the magnetic layer of from 20 nm to 100 nm is M20, and in the non-abrasive projections, the existing density of the non-abrasive projections having the heights from the surface of the magnetic layer of from 40 nm to 100 nm is M40, they meet the following relations;

$0.1 \leq Kt \leq 1.0 (numbers/\mu m^2)$ $0.01 \leq K10 \leq 0.2 (numbers/\mu m^2)$ $0.03 \leq M20 \leq 2.2 (numbers/\mu m^2)$ $M40 \leq 0.03 \leq (numbers/\mu m^2)$ $0.005 \leq K10/M20 \leq 1.0$.

The term "abrasive" in the phrase "projections composed of the abrasive (i.e., abrasive projections)" in the present specification means a particle selected from the group consisting of an alumina particle, a chromium oxide particle and a silicon carbide particle.

Accordingly, the phrase "projections composed of the abrasive" means projections formed on the magnetic layer surface with particles selected from the group consisting of alumina particles, chromium oxide particles and silicon carbide particles.

On the other hand, the term "non-abrasive projections" means projections formed on the magnetic layer surface other then the projections composed of the abrasive.

In the present invention, there is preferably provided the magnetic recording medium of the above aspect, wherein the thickness of the magnetic layer is from 0.1 to 1.0 μm and a non-magnetic layer mainly comprising a non-magnectic powder and a binder resin is disposed between the magnetic layer and the flexible non-magnetic support.

In the present invention, there is more preferably provided the magnetic recording medium of the above aspect, wherein the dynamic viscoelastic modulus of the total coated layers at the magnetic layer side existing on the flexible non-magnetic support at 30° C. is from $1.0 \times 10^{11}$ to $3.0 \times 10^{11}$ dyne/cm$^2$.

In the present invention, there is more preferably provided the magnetic recording medium of the above aspect, wherein the magnetic recording medium is a magnetic recording tape and the stiffness of the magnetic recording tape in the width direction is from 20 to 70 mm.g.

DETAILED DESCRIPTION OF THE INVENTION

Figure 1:
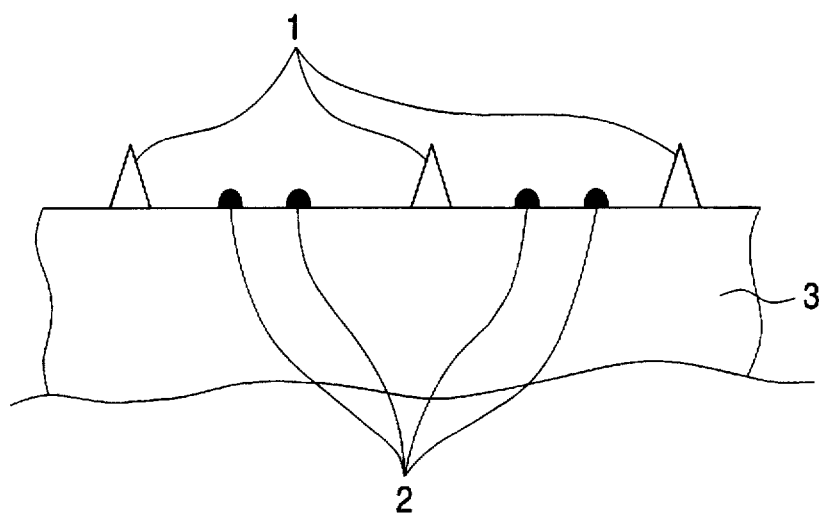
FIG. 1 is a schematic view showing the existing state of the projections on the surface of the magnetic layer of the magnetic recording medium of this invention.

Then, the present invention is described below in detail.

As described above, in the present invention, the heights and the existing densities of the abrasive projections and the non-abrasive projections on the surface of the magnetic layer are defined to the specific ranges to optimize the form of the surface of the magnetic layer, whereby the electromagnetic characteristics and the head abrasion can be well-balanced.

That is, in the present invention, the heights and the existing densities of the abrasive projections and the non-abrasive projections on the surface of the magnetic layer are controlled such that the number of the abrasive projections on the surface of the magnetic layer is insured and the heights of the abrasive projections become lower than the other projections (i.e., the non-abrasive projections) than the abrasive projections. By employing such a form of the surface of the magnetic layer, the contacting probability of the magnetic head and the abrasive projections are moderately lowered, whereby the reduction of the head abrasion and the running stability of the magnetic recording medium can be realized. In particular, a rotating head with a low contact pressure gives the remarkable effects as compared with a fixed head.

By moderately insuring the number of the abrasive projections on the surface of the magnetic layer, the occurrence of a tape damage caused by a high-pressure contact of a running magnetic recording tape with fixed guides, etc., can be prevented. Furthermore, by reducing the number of projections having a height of a certain height or more on the surface of the magnetic layer, and in particular, by removing the projections having the height of 40 nm or more, the spacing loss of the reproducing output can be reduced and the excellent electromagnetic characteristics are obtained.

Now, the term "projections" means protruded portions of the surface of a magnetic layer observed by a scanning type electron microscope or an atomic force microscope (AFM).

The term "abrasive projections" means that the solid components in the components constituting the projections are mainly the abrasive.

Also, the term "non-abrasive projections" means projections composed of solid lubricants, a magnetic powder, and binder components. Practically, they are projections mainly comprising solid lubricants such as carbon black, an organic filler powder, etc., and fine projections formed on the surface of a magnetic layer by the aggregates and nondispersed matters of a magnetic powder and the surface form of a non-magnetic support, etc.

The discrimination of "the abrasive projections" and "the non-abrasive projections" described above can be carried out by the EPMA analysis descried below. That is, by comparing the spectra obtained by irradiating the surface of a magnetic layer other than the projection portions with the spectra from the projection portions and from the type of the detected amount of an inorganic element constituting the abrasive and the observation of the form thereof, the kind of the projections is determined. Practically, the kind of the projections can be determined by comparing the detected amount of an Al element when the abrasive is Al$_2$O$_3$, the detected amount of a Cr element when the abrasive is Cr$_2$O$_3$, and the detected amount of a Si element when the abrasive is SiC.

Also, in the case of carbon black or an inorganic filler powder, the projections thereof can be determined by the observation of the form and by comparing the detected amount of a C element.

The existing density (Kt) of the abrasive projections was confirmed by observation by a scanning type electron microscope. Also, the existing densities of the projections K10, M20, M40, etc., requiring the information of the height direction were confirmed by observation of an atomic force microscope (AFM).

A preferred existing state of the projections on a magnetic layer is that the heights of the abrasive projections 2 are lower than the heights of the non-abrasive projections 1 on a magnetic layer 3 as shown in FIG. 1 showing schematically the state of the surface of the magnetic layer 3 and the existing densities of the projections are small as possible. Also, it is preferred that the heights of the abrasive projections and the heights of the non-abrasive projections are not more than the half of the average primary particle size of each of these particles and furthermore, when the heights of the non-abrasive projections are from ¹/₁₀ to ⅓ of the average primary particle size, the running durability of the magnetic recording medium is greatly improved.

The present invention is preferably used as a magnetic recording medium for high-density recording and for the purpose, a magnetic recording medium having the magnetic layer described above the thickness of which is from 0.1 to 1.0 μm, and preferably from 0.1 to 0.5 μm and having a non-magnectic layer mainly comprising a non-magnetic powder and a binder resin between said magnetic layer and the flexible non-magnetic support is preferred. By thinning the thickness of the magnetic layer as the upper layer, it becomes easy that the tops of the particles of the abrasive and the solid lubricant extrude through the surface of the magnetic layer. That is, in this case, while reducing the particle sizes of the abrasive and the non-abrasives such as a solid lubricant, etc., the necessary heights of the projections of them can be insured and also, the necessary existing densities of the projections can be insured with small addition amounts. Also, when the contents of the abrasive, etc., are reduced, the filling factor of the magnetic powder is increased to improve the magnetic property, whereby the electromagnetic characteristics are enhanced.

Since the formation of aggregates of the non-magnetic powder is less as compared with a ferromagnetic powder and also the particle sizes of the non-magnetic powder can be reduced as compared with the ferromagnetic powder, the surface property of the lower layer, Viz. a non-magnetic layer provided between the magnetic layer and the non-magnectic support, is smoothened and as the result thereof, the surface property of the upper layer, Viz. the magnetic layer, can be smoothened. Since thereby, the number of the projections of the magnetic layer components on the of the surface of the magnetic layer can be reduced, the non-abrasive projections mainly comprising the projections of the solid lubricant can be formed, whereby the running durability of the magnetic recording medium can be improved. In particular, spherical particles having an average primary particle size of not larger than 100 nm are used as the non-magnectic powder contained in the lower layer, the effect is remarkable.

In the present invention, it is preferred to optimize the dynamic viscoelastic modulus of the coated layers including the magnetic layer on the support for balancing the head abrasion or the running property of the magnetic recording medium and the electromagnetic characteristics. When the dynamic viscoelastic modulus of the coated layers including the magnetic layer is high, the sinking amount of the non-abrasive projections in the magnetic layer is reduced to lower the contacting probability of the magnetic head and the abrasive projections, whereby the abrasion of the magnetic head can be more restrained. Also, by lowering the sinking amount of the projections of the solid lubricant, the running property of the magnetic recording layer is improved, but when the dynamic viscoelastic modulus is too increased, the spacing loss of the magnetic recording medium and the magnetic head is increased to cause lowering of the electromagnetic characteristics. If the dynamic viscoelastic modulus is low, the reducing effect of the magnetic head abrasion and the effect of improving the running property of the magnetic recording medium are restrained, and if the dynamic viscoelastic modulus is too lowered, the deterioration of the running durability such as clogging, etc., occurs.

When the dynamic viscoelastic modulus of the coated layers including the magnetic layer is established high and the projections of the abrasive and the solid lubricant are controlled to be low, the head abrasion, the running durability, and the electromagnetic characteristics are liable to be well-balanced.

In the magnetic recording medium of a multilayer structure, when the layers are so constructed that the lower layer is softened and the upper layer is hardened to have a tenacity, while insuring the good contact with a magnetic head, sinking the projections of the abrasive and the solid lubricant on the surface of the upper layer can be restrained, whereby the effects of this invention become remarkable.

The foregoing viscoelastic modulus can be measured by "RHEOVIBRON DDV-II-A" (manufactured by Toyo Boldwin K.K.) at an excitation frequency of 110 Hz.

In the present invention, it is preferred that the stiffness of the magnetic recording tape is lowered, particularly, in the width direction from the view point of the restriction of the magnetic head abrasion but if the stiffness is too lowered, the contact of the magnetic recording tape with a magnetic head is deteriorated to lower the electromagnetic characteristics. Thus, when it is necessary to increase the stiffness of the magnetic recording tape for improving the electromagnetic characteristics, the object of this invention can be attained by controlling the stiffness by lowering the heights of the projections of the abrasive and the solid lubricant or lowering the dynamic viscoelastic modulus of the coated layers including the magnetic layer.

The stiffness of a magnetic recording tape can be measured using a kinematic strain meter (CPC-1D) manufactured by Chuou Seiki K.K. for a sample cut into a size of 8 mm×8 mm.

In the present invention, the preferred ranges of the various kinds of the existing densities of the projections on the surface of the magnetic layer, the dynamic viscoelastic modulus, and the stiffness are shown below. By employing the ranges, the effects of this invention become more remarkable.

Kt is preferably from 0.1 to 0.7 (numbers/$\mu m^2$), more preferably from 0.1 to 0.4 (numbers/$\mu m^2$), and most preferably from 0.1 to 0.2 (numbers/$\mu m^2$).

K10 is preferably from 0.01 to 0.15 (numbers/$\mu m^2$), more preferably from 0.01 to 0.1 (numbers/$\mu m^2$), and most preferably from 0.01 to 0.05 (numbers/$\mu m^2$).

M20 is preferably from 0.05 to 1.2 (numbers/$\mu m^2$) and more preferably from 0.1 to 0.6 (numbers/$\mu m^2$).

M40 is preferably not more than 0.02 (numbers/$\mu m^2$) and more preferably not more than 0.01 (numbers/$\mu m^2$).

Also, K10/M20 is preferably from 0.005 to 0.6, more preferably from 0.005 to 0.3, and most preferably from 0.005 to 0.1.

The stiffness of the magnetic recording tape in the width direction is preferably from 35 to 70 mm.g, and more preferably from 35 to 65 mm.g. Also, the ratio of (the stiffness in the lengthwise direction)/(the stiffness in the width direction) is preferably from 0.7 to 2.0, and more preferably from 1.5 to 2.0.

The dynamic viscoelastic modulus at 30° C. of the total coated layers at the magnetic layer side disposed on a flexible non-magnetic support is preferably from $1.0 \times 10^{11}$ to $2.5 \times 10^{11}$ dyne/$cm^2$, and more preferably from $1.5 \times 10^{11}$ to $2.5 \times 10^{11}$ dyne/$cm^2$.

In the present invention, the controlling methods of the existing density and the heights of the abrasive projections on the surface of the magnetic layer are as follows but the invention is not limited by these methods.

[1] Control of the existing density and the heights of projections of the abrasive on the surface of the magnetic layer:

(1) Use of Fine Particles of Abrasive:

When the kind and the addition amount of an abrasive are same to a magnetic powder, by using fine abrasive particles, the number of the abrasive projections on the surface of the magnetic layer can be increased in inverse proportion to the cube of the ratio of the particle sizes.

Thus, the necessary number of the abrasive projections on the surface of the magnetic layer is insured and the addition amount of the abrasive can be lowered, whereby the filling degree of the magnetic powder can be increased to improve the reproducing output. Also, when the particle sizes of the abrasive are reduced, the heights of the projections thereof on the surface of the magnetic layer can be lowered.

Now, the particle sizes of the fine abrasive particles are from 0.05 to 0.25 μm, and preferably from 0.10 to 0.20 μm as the average primary particle size and the addition amount of the fine abrasive particles is from 2.5 to 12.5 parts by weight, and preferably from 2.5 to 7.5 parts by weight per 100 parts by weight of the ferromagnetic powder.

(2) Formation of Abrasive Paste:

By forming the abrasive paste comprising the abrasive, a binder and a solvent, after single particle dispersing the abrasive, the dispersion of the abrasive is added to a magnetic solution comprising a ferromagnetic powder, non-abrasive particles, a binder and a solvent, the resulting solution is coated such that the heights of the projections of the abrasive become uniform. When the abrasive having a small specific surface area is used, the effect is more increased.

By using the same kind of the binder of the abrasive paste as the binder of the magnetic solution or by increasing the compatibility of the binder of the abrasive paste with the binder of the magnetic solution, the movement of the abrasive particles at the case of coating and drying the magnetic layer is restrained.

The abrasive paste can be obtained by mixing 100 parts by weight of the abrasive particles with from 2 to 50 parts by weight, and preferably from 5 to 15 parts by weight of a binder and from 50 to 200 parts by weight, and preferably from 80 to 120 parts by weight of a solvent and then dispersing the mixture using a sand mill.

As the abrasive being used, the abrasive particles of less sintering (necking) are preferred and with the proceed of the dispersion, the mixture becomes a single particle-dispersion. Necking can be controlled by shortening the time of sintering of the abrasive particles. For example, alumina such as Hit 60, Hit 70, Hit 80, Hit 82, Hit 100, etc., (trade names, made by Sumitomo Chemical Company, Limited) are liable to form secondary particles but necking is less, and the alumina can be ground to the primary particles with dispersion.

When the amount of the binder to the abrasive particles is increased or a high molecular-weight binder such as polyurethane is used, rising (or separation) of the abrasive particles on the surface of the magnetic layer at coating and drying the magnetic solution added with the abrasive paste is restrained.

(3) Abrasive Specific Gravity:

By using an abrasive having a large specific gravity, the sedimentation of the abrasive particles at the case of coating and drying the magnetic layer is promoted.

When the magnetic layer is coated upward on the lower surface of a non-magnetic support by an extrusion coating system, etc., and in this case, when an abrasive having a large specific gravity (true specific gravity) is used, the sedimentation of the abrasive particles proceed until the magnetic layer is coated and dried and many abrasive particles are protruded on the surface of the magnetic layer.

When the number of the abrasive being added with the same particle sizes, protruded number of $Cr_2O_3$ on the surface of the magnetic layer is larger than those of $Al_2O_3$ and SiC. Conversely, the number of the abrasive at the edge surfaces of the magnetic tape prepared by slitting a magnetic tape blank having a wide width becomes few in the case of $Cr_2O_3$. When the number of the abrasive being added with the same particle sizes is same, in the selection of the kind of the abrasive, $Al_2O_3$, SiC or $Cr_2O_3$, having a small specific gravity are preferred in a single layer system for insuring the scratch resistance at the slit edge surfaces of the magnetic tape. In a multilayer system, when the thickness of the upper layer is sufficiently thinner than the thickness of the lower layer, the lower layer may have the scratch resistance of the slit edge surfaces of the magnetic tape, and thus, by adding an abrasive having a large specific gravity ($Cr_2O_3$, etc.) into the upper layer and an abrasive having a small specific gravity into the lower layer, both the scratch resistance of the surface of the upper layer and the scratch resistance of the slitted edge surfaces can be insured.

In any cases, it is necessary to optimize the particle sizes of the abrasive, the addition amount of the abrasive, and the thickness of the magnetic layer such that the projections on the surface of the magnetic layer described above become the specific distribution and the specific heights.

(4) Using Solvent for Magnetic Solution:

When the magnetic solution was upward coated on the lower surface of a support to form a magnetic layer as shown below, a solvent having a low specific gravity is used for the magnetic solution and/or the ratio of a solvent in the magnetic solution is increased to promote the sedimentation of the abrasive particles at coating and drying the magnetic layer.

Also, a solvent having a high boiling point is used to delay drying after coating, thereby the sedimentation of the abrasive particles is promoted.

A magnetic layer frequently contains a mixture of several kinds of solvents and in this case, by controlling the mixing ratio of the solvents and the concentration of the magnetic solution, the states of coating and drying are changed, whereby the movement of the abrasive particles can be restrained or promoted. That is, during coating and drying, the movement of the abrasive particles is controlled by changing the state of the steric hindrance of the binder and the magnetic powder in the magnetic solution.

In the case of upward coating the magnetic solution on the lower surface of a support, when the sedimentation of the abrasive particles is promoted by lowering the specific gravity of the mixed solvent, using a high-boiling solvent, increasing the ratio of the good solvent to the binder, and/or lowering the concentration of the magnetic solution as described above, the abrasive particles are liable to protrude on the surface of the magnetic layer, whereby protruding of the abrasive particles on the surface of the magnetic layer as projections is promoted. Since there is no solvent having a low specific gravity and having a high boiling point, it is preferred to use a mixture of two or more solvents each having each properties.

When the mixed solvent is mainly composed of two components of methyl ethyl ketone (MEK) and cyclohexanone, the ratio of MEK/cyclohexanone is preferably from 3/7 to 8/2, and more preferably from 4/6 to 7/3.

If the content of MEK is higher than the foregoing range, drying of coating becomes quick, whereby the surface roughness occurs to lower the output. On the other hand, if the content of cyclohexane is higher than the foregoing range, after coating and drying, residual solvent remains, whereby the mechanical properties of the coated layer are lowered and problems of clogging, etc., are liable to occur. It is more preferred to add a solvent having an intermediate specific gravity and boiling point, such as toluene and butyl acetate to the mixed solvent of MEK and cyclohexane to control the evaporation rate of the solvents and spreading of the binder chain in the magnetic solution in coating and drying.

(5) Strong Pressing by Calender:

The surface of the magnetic layer is treated with a hard roll such as a metal roll, etc., under a high pressure and a high temperature to press the abrasive projections in the magnetic layer.

The line pressure is from 250 to 500 kg/cm, and preferably from 250 to 400 kg/cm, and when Tg of the magnetic layer after calender treatment is t°C., the treatment temperature (T) of the calender treatment is $t-10 \leq T \leq t+20[°C.]$, preferably $t-5 \leq T \leq t+10[°C.]$, and more preferably $t-5 \leq T \leq t+5[°C.]$.

If the line pressure and the treatment temperate are too higher than the foregoing ranges, the non-abrasive projections having heights of 20 nm or higher are reduced, the running property and durability of the magnetic recording medium are deteriorated, the ratio of K10/M20 is increased, and the head abrasion becomes large. Also, if the line pressure and the treatment temperature are lower than the foregoing ranges, the calender treatment becomes insufficient, the number of the abrasive projections having heights of 10 nm or higher are increased, the ratio of K10/M20 is increased, and the dynamic viscoelastic modulus of the magnetic layer is lowered, thereby the frequency of contacting the abrasive projections with a magnetic head becomes high to increase the head abrasion. Also, in this case, by lowering of the filling degree of the magnetic powder and the occurrence of surface roughening, the electromagnetic characteristics are lowered.

When fine abrasive particles (particle sizes of from 0.1 to 0.2 µm) are used and the content thereof in the magnetic layer is less (nor more than 10 parts by weight to 100 parts by weight of the magnetic powder), the calender treatment property is improved, and thus, it is preferred that the line pressure is from 250 to 350 kg/cm and the treatment temperature of the calender treatment is $t-5 \leq T \leq t+5(°C.)$ from the view point of preventing the head abrasion and improving the running durability.

(6) Blade Treatment:

By lapping a magnetic recording tape with an abrasive tape or with a rotary wheel having an outer surface thereof with a hard powder such as a diamond powder dispersed in a metal bond, the magnetic layer is subjected to an abrading treatment to top cut the projections of the abrasive.

Practically, as the system of blading by lapping a magnetic recording tape with an abrasive tape (LTBL system) and as a system of blading by lapping a magnetic recording tape with a rotary wheel having an outer surface thereof with a diamond powder, dispersed in a metal bond (DWBL system), preferred conditions are shown below.

Figure 2:
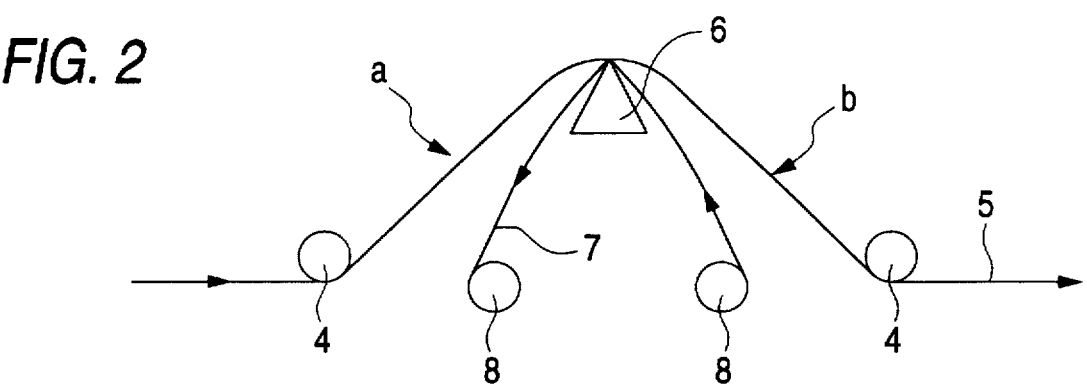
FIG. 2 is a conceptional view showing a blade treatment apparatus using the system of blading by lapping a magnetic recording tape with an abrasive tape (LTBL system)

FIG. 2 shows an conceptional view of an apparatus using the LTBL system. A magnetic recording tape 5 transferred is sent through a delivery roll 4 to the top of a sapphire blade 6 and is abraded. Thereafter, the magnetic recording tape 5 is wound through a delivery roll 4 to finish the treatment. In this case, between the sapphire blade 6 and the magnetic recording tape 5, a lapping tape (abrasive tape) 7 is transferred to the opposite direction to the magnetic recording tape 5 by rotary rolls 8. The detailed of this system is described in U.S. Pat. No. 5,009,929.

As the practical treatment conditions of the LTBL system, there are following ones.

Lapping tape: K-#10000, (trade name, made by Fuji Photo Film Co., Ltd.)

When the travelling velocity of the magnetic recording tape is V, the travelling velocity of the lapping tape is v, the tension of the magnetic recording tape at the portion (a) in FIG. 2 is $T_1$, and the tension of the magnetic recording tape at the portion (b) in FIG. 2 is $T_2$.

V=7 meters/second, v=20 mm/minute

Tension $T_2$: 100 to 150 g/8 mm slit

Tension $T_1$: 30 to 50 g/8 mm slit

Tension $T_2-T_1$: 50 to 120 g/8 mm slit are preferred.

Figure 3:
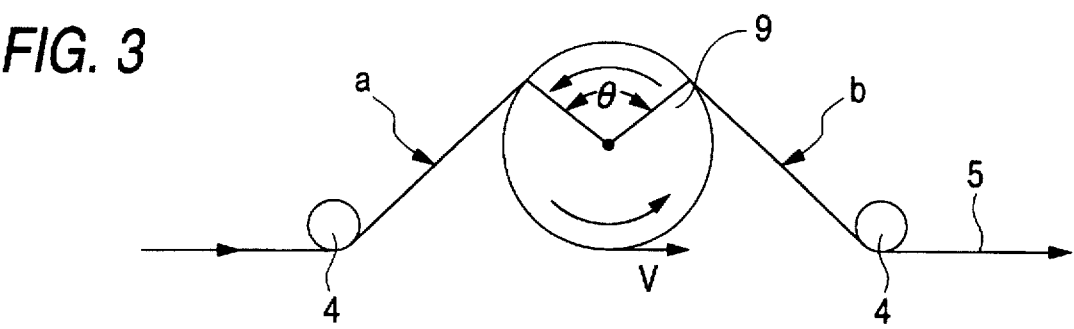
FIG. 3 is a conceptional view showing a blade treatment apparatus using a system of blading by lapping a magnetic recording tape with a rotary wheel having an outer surface thereof with a diamond powder dispersed in a metal bond (DWBL system).

FIG. 3 shows a conceptional view of the apparatus using the DWBL system. A magnetic recording tape 5 transferred is sent through a delivery roll 4 onto a rotary wheel 9 having an outer surface thereof a diamond powder dispersed in a metal bond and abraded. Thereafter, the magnetic recording tape is wound through a delivery roll 4 to finish the treatment. In this case, the rotary wheel 9 is rotated to the opposite direction to the transferring direction of the magnetic recording tape 5. The details of the system are described in U.S. Pat. No. 5,000,983.

As the practical treatment conditions of the DWBL system, there are the following conditions.

Rotary wheel 9:
  DW #800 (trade name, manufactured by Oriental Dia Kogyo Kenkyusho)
  Diameter: 7 cm
  Lap angle (θ): 90°
  #800 (Ra=0.5 to 1.3 µm)

When the transferring speed of the magnetic recording tape is V, the tangential speed of the rotary roll is v, the tension of the magnetic recording tape at the portion (a) in FIG. 3 is $T_1$, and the tension of the magnetic recording tape at the portion (b) in FIG. 3 is $T_2$.

V=v=3 to 7 meters/second

Tension $T_2$: 100 to 200 g/8 mm slit

Tension $T_1$: 30 to 100 g/8 mm slit

Tension $T_2-T_1$: 50 to 150 g/8 mm slit are preferred.

[2] Control of the existing density and the heights of other projections on the surface of the magnetic layer than the projections of the abrasive:

(1) Addition of Solid Lubricant:

The number and the heights of the projections of a solid lubricant on the surface of the magnetic layer are controlled by defining the specific gravity, the particle sizes, the specific area, and the addition amount of the solid lubricant being added.

1) By using a solid lubricant having a low apparent specific gravity, the number of the projections is increased.

2) By reducing the particle sizes, the heights of the projections are lowered.

3) By reducing the specific area of a solid lubricant, the dispersibility of the solid lubricant in the magnetic solution is increased to prevent the formation of the secondary particles, and while increasing the number of the projections, the heights thereof are restrained.

4) By increasing the addition amount of the solid lubricant, the number of the projections of the solid lubricant is increased.

By forming a paste of the solid lubricant, after single particle dispersing the solid lubricant, the dispersion of the solid lubricant is added to a magnetic solution, the heights of the projections of the solid lubricant on the surface of a magnetic layer are made uniform, and by using together the items 1) to 4) described above, the number of the projections of the solid lubricant having a specific height only can be increased.

By using the same kind of the binder in the magnetic solution as the binder for the solid lubricant paste or using the binder in the solid lubricant paste having a high compatibility with the binder of the magnetic solution, the movement of the solid lubricant particles at coating and drying the magnetic layer is restrained and the heights of the projections are restrained.

Also, by controlling the amounts and the kinds of the binders in the solid lubricant paste and the magnetic solution, the heights and the number of the projections are controlled.

As the solid lubricant, since an organic powder such as a melamine resin powder, etc., has not only a low specific gravity and a large effect of increasing the number of the projections as compared with an inorganic powder such as carbon black but also the organic powder itself is crushed by a calendering step, the heights of the projections can be low.

As the solid lubricant, the true specific gravity is not higher than 2, and preferably not higher than 1.6 and the apparent specific gravity measured using a solvent (using MEK) being used for the magnetic solution is from 0.1 to 1.0, and preferably from 0.2 to 0.5. Since in an organic filler such as a melamine resin powder, etc., the solvent in the magnetic solution does not permeate in the pores as compared with carbon black, the apparent specific gravity in the solvent being used for the magnetic solution is lowered and is liable to rise in the magnetic solution as compared with carbon black.

In a solid lubricant, the specific area is from 5 to 60 $m^2/g$, and preferably from 10 to 40 $m^2/g$, the oil absorption is from 30 to 100 ml/100 g, and the particle sizes are from 0.02 to 0.4 μm, preferably from 0.05 to 0.3 μm, and more preferably from 0.05 to 0.15 μm.

(2) Coating.Drying:

By controlling the viscosity behavior of the magnetic solution in the region from a low shearing speed to a high shearing speed and the shearing speed of the magnetic solution at coating, and by controlling the drying speed, the number and the heights of the projections of the solid lubricant on the surface of the magnetic layer can be controlled.

From the view point of uniform coating, it is preferred that the viscosity of the magnetic solution is low in the region of the high shearing speed and is high in the region of the low shearing speed. On the other hand, since the magnetic solution loses the shearing force immediately after coating, when it is considered that the magnetic solution is quickly changed from a high shear, the magnetic solution having a low viscosity in the low shearing region is less in the steric hindrance of the binder molecule, etc., and has a point that a solid lubricant, etc., which becomes projections during drying is liable to be protruded on the surface of the magnetic layer. Inversely, when the viscosity thereof is high, the protrusion of the solid lubricant, which become the projections, on the surface of the magnetic layer is restrained. Thus, by combining the control of the particle sizes and the addition amount of the solid lubricant being used and the control of the drying speed of the magnetic layer, the number and the heights of the projections can be controlled.

By coating a magnetic solution wherein the addition amount of a solid lubricant is increased while restraining the shearing speed by controlling a length of a slit in an extrusion coating head along travelling direction of the non-magnetic support (web) or controlling the coating speed and drying the coated layer with slow initial drying or by coating a magnetic solution wherein the addition amount of the fine particles of a solid lubricant is reduced at a high shear and quickly drying, a magnetic recording medium having many uniform and low projections is prepared.

In both the methods, the former method can more easily control the number and the heights of the projections.

(3) Thinning of Magnetic Layer:

By thinning the thickness of the magnetic layer, the number of projections on the surface of the magnetic layer caused by small masses in the magnetic layer such as undispersed matters and aggregates in the magnetic solution are increased. Also, the projections on the surface of the magnetic layer caused by the projections on a non-magnetic support being used are increased. By carrying out together lowering the heights of the projections on the surface of the magnetic layer caused by the small masses in the magnetic layer by strengthening the dispersion of the magnetic solution or strengthening the filtration of the magnetic solution, the number and the heights of the projections on the surface of the magnetic layer can be easily controlled.

(4) Multilayer Formation:

In the case of forming multilayered magnetic layers or in the case of forming a lower layer between a non-magnectic support and a magnetic layer, by using a magnetic powder or a non-magnetic powder having specific particle sizes for the lower layer, or adding other solid particles having specific particle sizes to the lower layer, the number of the projections on the surface of the magnetic layer can be increased. Also, by controlling the thickness of the upper layer i.e., the magnetic layer, or the thickness ratio of the upper layer/the lower layer, the transfer of a free binder and a solvent from the lower layer to the upper layer at coating.drying can be changed, whereby rising and sinking of the solid lubricant in the upper magnetic layer can be controlled.

In the case of the multilayered structure of an upper magnetic layer/a lower magnetic layer or an upper magnetic layer/a lower non-magnetic layer, the thickness of the upper magnetic layer is from 0.1 to 1.0 μm, preferably from 0.1 to 0.5 μm, and more preferably from 0.2 to 0.35 μm and the total thickness including the thickness of the lower layer is from 0.03 to 1.0 μm, preferably from 0.05 to 0.5 μm, and more preferably from 0.05 to 0.3 μm.

(5) Blade Treatment:

By lapping the magnetic recording tape with an abrasive tape (lapping tape) or by lapping the magnetic recording tape with a rotary wheel having a hard powder such as a diamond powder fixed on outer surface thereof, the magnetic layer is subjected to an abrasion treatment. When the magnetic recording tape is strongly lapped or the roughness of the abrasive tape or the rotary wheel is roughened, not only high projections are top cut but also the basis of the surface of the magnetic layer is scratched off, which results in increasing the projections.

When the surface layer portion of the magnetic layer is hardened by strongly pressing in a calendering step, scratching of the basis of the magnetic layer by the blade treatment is promoted.

For such a blade treatment, the foregoing method, conditions, etc., are applied as they are.

[3] The dynamic viscoelastic modulus of the magnetic layer is increased:

(1) Binder Formulation:

By using a binder having high Tg or by increasing the addition amount of a curing agent to a magnetic layer, the dynamic elastic modulus and Tg of the magnetic layer are increased.

In the surface treatment or the kneading.dispersion of a magnetic powder, a force is mechanically applied to increase the amount of the binder adsorbed on the magnetic powder, whereby the bonding strength of the magnetic powder and the binder is increased.

Tg of the binder is preferably from 30 to 90° C., the content of the curing agent is from 10 to 40% by weight of the binder. When a mixture of polyvinyl chloride and polyurethane is used as a binder, which is a preferred embodiment of the invention, the weight ratio of polyvinyl chloride/polyurethane is from 90/10 to 60/40, and Tg of polyurethane alone is from −10° C. to 90° C., and preferably from 20° C. to 90°C. Polyvinyl chloride or polyurethane may be used singly.

[4] Preparation method of stiffness:

The stiffness is prepared by a flexible non-magnetic support. By selecting the quality of the material such as a polyethylene terephthalate (PET), a polyethylene naphthate (PEN) or an aromatic polyamide such as an aramid resin, etc., or by selecting the stretching degree of a plastic support in the production process thereof, the stiffness is prepared.

When a non-magnetic support having a thickness of at least 6.5 μm is used in the case of using the magnetic layer having a Young's modulus of from 1500 to 2000 kg/mm², PET of BO (balance type) or a ST type (lengthwise stretched type) is preferred and when a non-magnetic support having a thickness of from 5.0 to 6.5 μm is used, PEN of BO (balance type) or WST (widthwise stretched type) is preferred. Furthermore, a thin non-magnetic support having a thickness of not more than 5 μm, an aromatic polyamide is preferably used.

Then, the abrasives being used for the magnetic layers are described in detail.

As explained hereinbefore an abrasive used in the present invention is selected from an alumina, chromium oxide, silicon carbide or a combination thereof.

Specific examples of an alumina include α-alumina having an α-conversion of from 90 to 100%, β-alumina and γ-alumina. They can be used singly or as a combination of them. The particularly preferred are α-alumina, chromium oxide or a mixture thereof.

The abrasive being used in this invention is used by variously changing the kind, the amount, the particle sizes, the combination, the form, etc., for defining the existing densities and the heights of the projections on the surface of the magnetic layer to the specific ranges described above. The practical standards of the various conditions of the abrasives which can be used in this invention are described below.

The average particle size of the abrasives is preferably from 0.01 to 0.60 μm but the particularly preferred average particle size of the abrasive powder is from 0.01 μm to 0.25 μm. The tap density is from 0.05 to 2 g/ml, and preferably from 0.2 to 1.5 g/ml. The water content of the abrasive is from 0.05 to 5% by weight, and preferably from 0.2 to 3% by weight. The specific area of the abrasive powder is from 1 to 100 m²/g, preferably from 5 to 50 m²/g, and more preferably from 7 to 40 m²/g. The oil absorption using DBP is from 5 to 100 ml/100 g, preferably from 10 to 80 ml/100 g, and more preferably from 20 to 60 ml/100 g. The specific gravity is from 1 to 12, and preferably from 3 to 6. The form of the abrasive may be an acicular form, a spherical form, a polyhedral form, a tabular form, etc.

Also, it is preferred that the ignition loss of the abrasive powder is from 0 to 20% by weight. The Mohs' hardness of the abrasive powder being used in this invention is preferably from 7 to 10. The roughness factor of the surface of the abrasive powder is preferably from 0.5 to 1.5, and more preferably from 0.9 to 1.2. The SA (stearic acid) adsorption amount onto the abrasive powder is preferably from 1 to 20 μmols/m², and more preferably from 2 to 15 μmols/m². The heat of wetting of the abrasive powder in the non-magnectic layer to water at 25° C. is preferably in the range of from 200 erg/cm$^{11}$ to 600 erg/m². Also, a solvent in the range of the heat of wetting can be used. The amount of water molecules on the surface at a temperature of from 100 to 400° C. is properly from 1 to 10 pieces/100. It is preferred that pH of the isoelectric point in water is from 3 to 6.

It is preferred that the surface of the abrasive powder is subjected to a surface treatment with $Al_2O_3$, $SiO_2$, $TiO_2$, $ZrO_2$, $SnO_2$, $Sb_2O_3$, or ZnO. In particular, for the dispersibility, $Al_2O_3$, $SiO_2$, $TiO_2$, and $ZrO_2$ are preferred but $Al_2O_3$, $SiO_2$, and $ZrO_2$ are more preferred. They can be used as a combination of them or may be used singly. Also, according to the purpose, the abrasive powder having the coprecipitated surface treated layer may be used, or a method of first treating the surface of the powder with alumina and then treating the surface layer with silica, or the contrary method can be employed. Furthermore, according to the purpose, the surface layer of the abrasive powder may become a porous layer by the surface treatment but the uniform and dense layer is generally preferred.

Specific examples of the inorganic abrasive powder being used for the magnetic layer include Nanotite (trade name, made by SHOWA DENKO K.K.); Hit 100, Hit 82, Hit 80, Hit 70, Hit 60A, Hit 55, AKP 20, AKP 30, AKP 50 (trade names, made by Sumitomo Chemical Company, Limited); ERC-DBM, HP-DBM, HPF-DBM, HPFX-DBM, HPS-DBM, and HPSX-DBM (trade names, made by Reynolds Corporation); WA 8000 and WA 10000 (trade names, made by Fujimi Kenmazai K.K.); UB 20, UB 40B, and Mecanox U4 (trade names, made by Kamimura Kogyo K.K.); UA 2055, UA 5155, and UA 5305 (trade names, made by Showa Keikinzoku K.K.); G5, Kuromex M, Kuromex S1, Kuromex U2, Kuromex U1, Kuromex X10, and Kuromex KX10 (trade names, made by The Nihon Chemical Industrial Co., Ltd.); ND 803, ND 802, and ND 801 (trade names, made by Nihon Denko K.K.); F-1, F-2, and UF-500 (trade names, made by Tosoh Corporation); SiC and UF (trade names, made by Central Glass Co., Ltd.); and Beta-Random Standard and Beta-Random Ultrafine (trade names, made by IBIDEN CO., LTD.).

By mixing carbon black with the magnetic solution for forming the magnetic layer, the number and the sizes of the projections in this invention can be controlled. For the purpose, furnace black for rubbers, thermal black for rubbers, carbon black for colors, acetylene black, etc., can be used.

In the case of using carbon black, the amount thereof is preferably from 0.1 to 10% by weight, and more preferably from 0.2 to 3% by weight to the amount of the ferromagnetic metal powder. Accordingly, in the case of using these carbon blacks, the kinds, the amounts, and the combination are changed for the upper magnetic layer and the non-magnetic layer, and they are used based on the average particle size, the oil absorption, the electric conductivity, pH, etc.

Then, the standard of the various characteristics of carbon black being added to the magnetic layer is explained.

The specific area of the carbon black is from 5 to 300 m²/g, and preferably from 5 to 100 m²/g, and DBP oil absorption is from 20 to 150 ml/100 g, preferably from 30 to 100 ml/100 g, and more preferably from 50 to 100 ml/100 g. Also, (specific area)×(primary particle sizes) is from 1500 to 3000 nm.m²/g, and preferably from 2000 to 3000 nm.m²/g. The ratio of (DBP oil absorption)/(specific area) is from 1 to 5 (ml/100 m²), and preferably from 1 to 5 (ml/100 m²).

Since in the average particle size of the carbon black, the lower limit is 5 m μ and the upper limit is 300 mμ as described in the examples, the range of the average particle size of the carbon black is from 5 mµ to 300 mµ, preferably from 10 mµ to 80 mµ, and more preferably from 10 mµ to 40 mµ. Also, it is preferred that pH of the carbon black is from 2 to 10, the moisture content thereof is from 0.1 to 10%, and tapping density is from 0.1 to 1 g/ml.

Specific examples of the carbon black being used in the present invention include BLACKPEARLS 2000, 1300, 1000, 900, 800, 880, 700, and VULCAN XC-72 (trade names, made by Cabot Corporation); #75, #70, #70L, #60, #60U, #55, #60H, #50, #50U, #35, LAMP, B101, THERMAX, and MT (trade names, made by Asahi Carbon K.K.); #3050B, #3150B, #3250B, #3750B, #3950B, #950, #650B, #970B, #850B, MA-600, #MA 220, #95, #MA 230, #22B, #20B, #30, #32, #33, #50, and #52 (trade names, made by MITSUBISHI KASEI CORPORATION); CONDUCTX SC, RAVEN(s) 8800, 8000, 7000, 5750, 5250, 3500, 2100, 2000, 1800, 1500, 1255, and 1250, RAVEN MT-P, RAVEN 410, RAVEN 420, RAVEN 430B, RAVEN 22P, RAVEN 450, PRINTEX G, PRINTEX 25, PRINTEX 20, PRINTEX A, PRINTEX 35, PRINTEX 140, and PRINTEX 150 (trade names, made by Columbia Ribbon & Carbon Mfg. Co., Ltd.); and Ketjen Black (trade name, made by Akzo Co., Ltd.).

In the case of using the carbon black, the carbon black may be surface treated with a dispersing agent or may be grafted with a resin, or a part of the surface of the carbon black may be graphitized.

About the carbon blacks which can be used for the magnetic layers in this invention, the description of *Carbon Black Binran (Handbook)*, edited by Carbon Black Society can be referred to.

Also, in this invention, for establishing the existing densities and the sizes of the projections of this invention, an organic powder can be added to the magnetic layer. As the organic powder, there are, for example, an acryl-styrene series resin powder, a benzoguanamine resin powder, a melamine series resin powder, and a phthalocyanine series pigment powder, but a polyolefin series resin powder, a polyester series resin powder, a polyamide series resin powder, a polyimide series resin powder, and a polyethylene fluoride resin powder can be also used. As the production method of the organic powder, the methods described in JP-A-62-18564 and JP-A-60-255827 can be used.

The particle sizes of the organic powder are from 50 mµ to 300 mµ, and preferably from 100 mµ to 300 mµ.

Practical examples of the organic powder include Sphilex (trade name, made by DAINICHISEIKA COLOR & CHEMICALS MFG. CO., LTD.), Epostar S (trade name, made by NIPPON SHOKUBAI CO., LTD.), etc.

As the ferromagnetic powder being used for the magnetic layer of the present invention, the average long axis length is from 0.05 to 0.35 µm, and preferably from 0.05 to 0.20 µm, and known ferromagnetic powders such as $\gamma\text{-}Fe_2O_3$, Co-modified $\gamma\text{-}Fe_2O_3$, $FeO_x$ (x is from 1.33 to 1.5), Co-modified $FeO_x$ (x is from 1.33 to 1.5), a ferromagnetic metal powder composed of α-Fe, Ni, or Co as the main component (at least 75%), barium ferrite, strontium ferrite, etc., can be used. These ferromagnetic powders may contain other atoms such as Al, Si, S, Sc, Ca, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, etc., in addition to the definite atom.

In the present invention, in the ferromagnetic powders described above, the ferromagnetic metal powder composed of α-Fe as the main component is preferred. In particular, the ferromagnetic metal powder having the composition shown below is preferred.

It is considered that by controlling the content of Ni atoms to the Fe atoms in the ferromagnetic metal powder to $5 \times 10^{-}$ to 0.4 atomic %, and preferably from $5 \times 10^{-4}$ to 0.2 atomic %, the dislocation number of the ferromagnetic metal powder in the crystal lattice is controlled and the extent of the plastic deformation can be optimized and thus the magnetic powder can be prevented from becoming brittle, which results in preventing the occurrences staining of a magnetic head, clogging of the magnetic head, and staining of calender rolls.

In the present invention, it is preferred that the ferromagnetic metal powder contains Mg atoms in an amount of from 0.1 to 2.0 atomic %, more preferably from 0.2 to 1.5 atomic %, and particularly preferably from 0.4 to 1.5 atomic % to the Fe atoms.

Mg has an effect of increasing the number of the nucleation points at burning the magnetic powder and thus the particle sizes of the ferromagnetic metal particles obtained can be fined. In the ferromagnetic metal powder of this invention, it is particularly effective to control the long axis length of the ferromagnetic metal powder by the addition amount of Mg. Furthermore, since the magnetic oxide formed by the oxidation of the surface of the ferromagnetic metal powder containing Mg is hard, the magnetic recording medium is excellent in the abrasion resistance to a magnetic head and staining of a magnetic head can be more efficiently prevented.

Furthermore, in the present invention, by defining the Ca atom amount in the ferromagnetic metal powder to from $5 \times 10^{-4}$ to 0.2 atomic %, and preferably from $5 \times 10^{-4}$ to 0.1 atomic % and the alkali metal amount to $5 \times 10^{-4}$ to 0.2 atomic %, the adsorption amount of a binder resin by the ferromagnetic metal powder is increased and thus the adsorbed layer of the binder resin on the surface layer of the magnetic powder becomes thick, whereby the direct contact of the magnetic powder with a magnetic head can be prevented and thus, the occurrence of baking stain of the magnetic head can be prevented.

Also, the strength of the magnetic layer is enhanced with increase of adsorptivity of the binder resin onto the ferromagnetic metal powder and therefore generation of clogging due to scratching of the magnetic layer can be prevented.

It is most effective to define said Ca amount and alkali amount, in particular, the Na amount, but it is necessary to restrain other alkaline earth metals and alkali metals entering as impurities at the preparation of the magnetic powder and it is preferred to restrain the total amount of these impurities to 1 atomic % or less.

By defining the Ca amount and the alkali metal amount of the ferromagnetic metal powder in this invention, the formation of the salts of Ca and the alkali metal with a fatty acid can be restrained and the free fatty acid amount can be reduced, whereby the formation of the salts by the reaction of the fatty acid with the alkali metal and Ca can be restrained, which results in preventing the occurrence of staining of a magnetic head, capable of reducing the heat abrasion, and also restraining lowering of the output.

Also, it is preferred that the ferromagnetic metal powder being used in this invention contains the following atoms in the ranges shown below to the Fe atom of the ferromagnetic metal powder. That is, an Al atom is in the range of from 4 to 15 atomic %, a rare earth element is in the range of from 0.1 to 10 atomic %, and particularly from 1.0 to 3.0 atomic %, an Si atom is in the range of from $5 \times 10^{-4}$ to 1.5 atomic %, and particularly from $5 \times 10^{-4}$ to 0.1 atomic %, and a Co atom is in the range of from 5 to 35 atomic %, and particularly from 10 to 35 atomic %.

The elements being contained in the ferromagnetic metal powder in this invention described above have the following functions and the best content of each element can be determined for giving the function.

The Al atom and the rare earth element such as the Y atom, etc., have a function of increasing the strength of the ferromagnetic metal powder itself, exist at the surface portion of the ferromagnetic powder, and with deeper from the surface layer, the content of each atom is reduced at almost the same ratio. Also, the Si atom is in the state of existing in more surface layer than the Al atom. The Al atom of the surface layer of the ferromagnetic metal powder is bonded with an oxygen atom to form alumina, which is hard and has a high abrasive force.

However, when the inside of the ferromagnetic metal powder and the crystal bonded state of the surface layer portion are weak, the hard surface portion is scratched. Also, since the hard surface portion is reluctant to be plastic-deformed, whereby the surface portion is liable to become brittle.

Thus, by defining the content of said Ni atom to from $5 \times 10^{-4}$ to 0.4 atomic %, the crystal structure of Fe—Ni—Al, etc., in the ferromagnetic metal powder is reduced, the Fe crystal structure and the crystal of Fe—Al, etc., are increased, the dislocation number and the change in the Fe crystal are restrained and the ferromagnetic metal power is made to easily cause the plastic deformation, whereby the surface portion of the ferromagnetic metal powder is prevented from becoming brittle and being scratched.

Also, when the Co atom exists, the strength of the crystal structure is increased and thus scratching of the surface portion of the ferromagnetic metal powder is more prevented.

The addition of the Si atom and the rare earth element such as the Y atom has the function of controlling the hardness of the surface portion of the ferromagnetic metal powder.

That is, by increasing the ratio of the Si atom and the rare earth element to the Al atom, the abrasive force can be lowered and by controlling the contents of these atoms, a function of insuring the durability of the magnetic tape is obtained while restraining the abrasion of a magnetic head.

Also, the Si atom in the ferromagnetic metal powder has a function of restraining the curing reaction of the isocyanate in the binder resin.

Accordingly, since when the amount of the Si atom is increased, the curing reaction of the isocyanate is restrained, the surface portion of the magnetic layer is agglutination fluctured or scratched to cause staining of a magnetic head. In particular, it is remarkable when a thermal treatment (a heat treatment for accelerating curing of the binder resin after coating and drying the magnetic layer) is not applied.

For the counterplan described above, it is effective to lower the content of the Si atom in the ferromagnetic metal powder by using Al or the rare earth metal such as Y, etc., as a sintering preventing agent of the ferromagnetic metal powder and removing a slight amount of Si entering in the production process of the ferromagnetic metal powder by heating washing water in the washing process, controlling pH of washing water, etc.

In the present invention, since by using the ferromagnetic metal powder having the composition described above, the adsorption ratio of the binder resin to the ferromagnetic metal powder is improved, a magnetic recording medium which does not cause baking type staining of a magnetic head and does not cause clogging by the insufficiency of the strength of the magnetic layer even when the amount of the binder resin in the magnetic layer is lowered, and also reducing staining of calender rolls in contact with the magnetic layer side can be produced. Also, by lowering the amount of the binder resin, the filling factor of the ferromagnetic metal powder is substantially improved, which can contribute the insurance of the output. In the present invention, the content of the binder resin in the magnetic layer is preferably from 12 to 28 parts by weight, and more preferably from 15 to 23 parts by weight to 100 parts by weight of the ferromagnetic metal powder. In this case, the binder resin means the case of containing a crosslinking agent.

Also, by adsorbing an organic phosphorus compound such as phenylphosphonic acid onto the ferromagnetic metal powder or by using a binder resin having a specific polar group, such as a vinyl chloride series copolymer and urethane, the dispersibility of the ferromagnetic metal powder is increased and the foregoing effects become more remarkable.

Furthermore, a multilayer structure (upper magnetic layer: ferromagnetic metal powder/lower magnetic layer: γ-iron oxide, upper magnetic layer: ferromagnetic metal powder/lower layer: inorganic non-magnetic powder, etc.) by a simultaneous coating has a tendency of increasing the amount of the surface binder resin as compared with a single magnetic layer composed of the ferromagnetic metal powder as the main component from the view points of the coating and drying conditions and the properties of solution, whereby in the multilayer structure, the effects become more clear. Also, in the case of using the fine particles of the ferromagnetic metal powder, the amount of the binder resin of the surface layer of the magnetic layer is increased, the effects becomes more remarkable.

However, since when the amount of a free binder resin which is not adsorbed on the ferromagnetic metal powder is large at the surface layer of the magnetic layer, a fluid deformation of the binder resin is caused at repeated running of the magnetic recording tape and the binder resin attaches to a magnetic head to cause staining of the magnetic head, it is necessary to optimize the addition amount of the binder resin as described above.

As the production method of the ferromagnetic metal powder being used in this invention, conventionally well-known production methods can be used but it is necessary to control the amounts of an alkali metal, Ca, and Ni such that these amounts become the range described above.

As the control means regarding the alkali metal and Ca, it is effective to insert a washing process in the production process of the ferromagnetic metal powder. That is, an iron oxyhydroxide powder, an iron oxide powder, or a metal powder is washed with water. In particular, with the progress of the production process of the ferromagnetic powder using the iron oxyhydroxide, the iron oxide, or the metal, there is a tendency that the trace elements are segregated on the surface of the particles thereof, thereby the removal of the elements by washing becomes easy. In this case, by heating washing water, controlling pH of washing water, or selecting an acid or a base being added to washing water, the washing process can be more efficiently carried out. Also, it is, as a matter of course, effective to reduce impure elements in the raw materials as less as possible.

As the means for controlling the amount of Ni, there is a method of adding or removing Ni in each step of the production process of a ferromagnetic metal powder from the raw material of the ferromagnetic metal powder, and practically there is a method of quantitatively adding Ni to the raw material of the ferromagnetic metal powder.

Also, as a means of incorporating Mg, Al, a rare earth element, Si, Co, or other trace elements described below in the ferromagnetic metal powder, there is a method of carrying out a removing treatment (includes the same removing treatment of Ca or the alkali metal described above) or an addition treatment of Mg, etc., in each step of the production process of the ferromagnetic metal powder from the raw material of the ferromagnetic metal powder, and as the addition treatment; there is practically a method of quantitatively adding Al, the rare earth element, etc., in the sintering prevention treatment of the ferromagnetic metal powder and forming the oxide of each element in the ferromagnetic metal powder. In addition, the amount of the trace element is from $5\times10^{-4}$ to 1 atomic % to Fe in the ferromagnetic metal powder.

As said trace element, there are S, Ti, V, Cr, Cu, MO, Rh, Pd, Ag, Sn, Sb, Te, Ta, W, Re, Au, Hg, Pb, Bi, P, Mn, Zn, B, etc.

The ferromagnetic metal powder being used in this invention may be previously treated with a dispersing agent, a lubricant, a surface active agent, an antistatic agent, etc., described below before dispersing the powder.

Practically, such treatments are described in JP-B-44-14090, JP-B-45-18372, JP-B-47-22062, JP-B-47-22513, JP-B-46-28466, JP-B-46-38755, JP-B-47-4286, JP-B-47-12422, JP-B-47-17284, JP-B-47-18509, JP-B-47-18573, JP-B-39-10307, and JP-B-48-39639 (the term "JP-B" as used herein means an "examined Japanese patent publication"), U.S. Pat. Nos. 3,026,215, 3,031,341, 3,100,194, 3,242,005, 3,389,014, etc.

The ferromagnetic metal powder being used in this invention may contain a small amount of a hydroxide or an oxide.

As the ferromagnetic metal powder in this invention, ferromagnetic metal powders produced by well-known production methods can be used and as the production methods, there are following methods. That is, there are (1) a method of reducing iron oxide with a composite organic acid salt (mainly an oxalate) and a reducing gas such as hydrogen, (2) a method of obtaining Fe particles or Fe—Co particles by reducing iron oxide with a reducing gas such as hydrogen, (3) a method of thermally decomposing a metal carbonyl compound and a method of adding a reducing agent such as sodium boron hydride, a hypophosphite, hydrazine, etc., to an aqueous solution of a ferromagnetic metal to reduce the ferromagnetic metal, (4) a method of obtaining the fine powder of a metal by evaporating the metal in an inert gas of a low pressure, etc.

The ferromagnetic metal powder thus obtained may be subjected to a well-known gradual oxidation treatment with for example, a method of immersing in an organic solvent and drying, a method of immersing in an organic solvent and after sending an oxygen-containing gas into the solution to fore an oxide layer on the surface of the ferromagnetic metal powder, drying, or a method of forming an oxide layer on the surface of the ferromagnetic metal powder by controlling the partial pressures of an oxygen gas and an inert gas without using an organic solvent.

The average long axis length of the acicular ferromagnetic metal powder of the magnetic layer in this invention is from 0.04 to 0.12 μm, and preferably from 0.06 to 0.10 μm and the specific area shown by a BET method is from 25 to 80 m²/g, and preferably from 40 to 70 m²/g. If the specific area is less than 25 m²/g, the noise is increased, while the specific area is more than 80 m²/g, a good surface property is undesirable reluctant to obtain.

The acicular ferromagnetic metal powder in this invention having the specific average long acid length and the specific acicular ratio is produced by adding a slight amount of the 3rd element such as Mg, Y, etc., and thus by controlling the formation of the nuclei of non-magnetic precursors by properly selecting the addition amount according to the kind of the element.

The crystallite sizes of the ferromagnetic metal powder of the magnetic layer of this invention are from 100 to 450 Å, preferably from 100 to 350 Å, and more preferably from 100 to 250 Å. The saturation magnetization ($\sigma_s$) is preferably from 100 emu/g to 200 emu/g, and more preferably from 135 emu/g to 170 emu/g. The coercive force is preferably from 1,700 to 3,000 Oe, and more preferably from 1,700 to 2,700 Oe. The acicular ratio is from 3 to 10, and preferably from 4 to 10. The moisture content is preferably from 0.01 to 2%. According to the kind of the binder, it is preferred that the moisture content is optimized. The tapping density is from 0.2 to 0.8 g/ml. If the tapping density is larger than 0.8 g/ml, the oxidation is liable to proceed at the press-densifying step of the ferromagnetic metal powder and it becomes difficult to obtain a sufficient saturation magnetization e,. Also, if the tapping density is less than 0.2 g/ml, the dispersion becomes liable to be insufficient. Also, it is preferred that pH is optimized by the combination with the binder being used. The range is from 4 to 12, and preferably from 6 to 10.

The void of the ferromagnetic metal powder being used in this invention is as less as possible and the value is from 0 to 20% by volume and more preferably from 0 to 5% by volume. SFD (Switching Field Distribution) is preferably from 0.1 to 0.6 and also it is preferred to reduce the distribution of Hc. For the purpose, there are a method of improving the particle size distribution of goethite, a method of preventing sintering of γ-hematite, etc.

The adsorption amount of the lubricant such as a fatty acid, etc., to the ferromagnetic metal powder in this invention is usually not more than 0.5 mg/m², and preferably from 0.01 to 0.25 mg/m² per a unit surface area of the magnetic powder.

In this invention, the coated layer may be a single magnetic layer or the coated layer may be plural layers composed of a plural layer structure comprising the magnetic layer and a non-magnetic layer (lower layer) formed between the magnetic layer and a non-magnetic support. In the latter case, a fatty acid can be incorporated in the non-magnectic layer. In addition, each of the magnetic layer and the non-magnetic layer may be composed of plural layers.

Also, when the magnetic layer is a plural layer structure, the farthest layer from the non-magnetic support is called the uppermost layer (also called the upper magnetic layer) and other layer(s) are called lower magnetic layer(s). For the lower magnetic layer(s), γ-FeO$_x$ (x is from 1.33 to 1.5), Co-modified γ-FeO$_x$ (x is from 1.33 to 1.5), a ferromagnetic metal powder, etc., can be used.

Since in the present invention, the adsorbed amount of a binder resin, in particular, a polar group-containing binder resin to the ferromagnetic metal powder can be uniquely improved, and the bonding strength with the binder resin can be improved owing to the use of the foregoing ferromagnetic metal powder, even when the amount of the binder resin is reduced, a mechanically strong coated layer is formed, which is effective for the resistance to the abrasion by a magnetic head.

In the case of using a vinyl chloride series resin to the ferromagnetic metal powder, the amount thereof is from 5 to 15% by weight, in the case of using a polyurethane resin, the amount thereof is from 2 to 10% by weight, and polyisocyanate is in the range of from 2 to 10% by weight, and it is preferred to use the combination thereof.

In this invention, in the case of using polyurethane, it is preferred that the glass transition point thereof is from −50° C. to 100° C., the breaking elongation is from 100 to 2,000%, the breaking stress is from 0.5 to 10 kg/cm$^2$, and the yield point is from 0.05 to 10 kg/cm$^2$.

In the present invention, it is preferred that the magnetic layer and/or the non-magnetic layer contains a fatty acid.

As the fatty acid being used in this invention, a monobasic fatty acid having from 8 to 24 carbon atoms can be used and a monobasic fatty acid having from 8 to 18 carbon atoms is preferred. Specific examples of the fatty acid include lauric acid, caprylic acid, capric acid, myristic acid, palmitic acid, stearic acid, behenic acid, oleic acid, linoleic acid, linolenic acid, and elaidic acid.

The amount of the fatty acid used in this invention is, in the case of adding the fatty acid to the magnetic layer, is preferably from 0.2 to 5.0% by weight, and particularly preferably from 0.5 to 2.0% by weight based on the amount of the ferromagnetic metal powder.

Then, other materials than the ferromagnetic metal powder and the fatty acid being used for the magnetic layer of this invention are described in detail.

As the binder being used in this invention, conventionally known thermoplastic resins, thermosetting resins, reactive type resins, and a mixture of them are used.

The thermoplastic resin being used in this invention has a glass transition temperature of from −20° C. to 90° C., a number average molecular weight of from 1,000 to 200,000, and preferably from 10,000 to 100,000, and a polymerization degree of from about 50 to 1,000.

Examples of such the binder include polymers or copolymers containing vinyl chloride, vinyl acetate, vinyl alcohol, maleic acid, acrylic acid, an acrylic acid ester, vinylidene chloride, acrylonitrile, methacrylic acid, a methacrylic acid ester, styrene, butadiene, ethylene, vinylbutyral, vinylacetal, vinyl ether, etc., as the constituting units; a polyurethane resin, various kinds of rubber series resins.

Examples of the thermosetting resin and the reactive type resin include a phenol resin, an epoxy resin, a polyurethane setting type resin, a urea resin, a melamine resin, an alkyd resin, an acrylic resin, a formaldehyde resin, a silicone resin, an epoxy-polyamide resin, a mixture of a polyester resin and an isocyanate polymer, a mixture of a polyesterpolyol and polyisocyanate, and a mixture of polyurethane and a polyisocyanate. These resins are described in detail in *Plastic Handbook*, published by Asakura Shoten K.K. Also, a known electron ray curing type resin can be used for the non-magnetic layer and/or the upper magnetic layer.

Examples of these binders and the production methods thereof are described in JP-A-62-256219. These resins can be used singly or as a combination thereof but as preferred examples there are a combination of a polyurethane resin and at least one of a vinyl chloride resin, a vinyl chloride vinyl acetate resin, vinyl chloride vinyl acetate vinyl alcohol resin, and vinyl chloride vinyl acetate maleic anhydride copolymer and the combinations of polyisocyanate and the above combinations.

As the polyurethane resin, well-known polyurethane resins such as polyesterpolyurethane, polyetherpolyurethane, polyetherpolyesterpolyurethane, polycarbonatepolyurethne, polyesterpolycarbonatepolyurethane, polycaprolactonepolyurethane, polyolefinpolyurethane, etc., can be used.

In all the binders described above, for obtaining the more excellent dispersibility and durability, it is preferred to use at least one of the polyurethane resin and the vinyl chloride series resin having introduced thereto by a copolymerization or an addition reaction at least one selected from —COOM, —SO$_3$M, —OSO$_3$M, —P=O(OM')$_2$, —O—P=O(OM')$_2$ (wherein M represents a hydrogen atom or an alkali metal atom and M' represents a hydrogen atom, an alkali metal atom, or a lower hydrocarbon group), —OH, —NR$_2$, —N$^+$R$_3$ (wherein R represents a hydrocarbon atom having from 1 to 12 carbon atoms), an epoxy group, —SH, —CN, sulfobetaine, carboxybetaine, phosphobetaine, etc., and preferably at least one selected from —COOM, —SO$_3$M, —OSO$_3$M, and —P=O(OM')$_2$.

The amount of such a polar group is from $10^{-8}$ to $10^{-1}$ mol/g, preferably from $10^{-6}$ to $10^{-2}$ mol/g, and more preferably from $3\times10^{-5}$ to $20\times10^{-5}$ mol/g.

Specific examples of these binders being used in the present invention include VAGH, VYHH, VMCH, VAGF, VAGD, VROH, VYES, VYNC, VMCC, XYHL, XYSG, PKHH, PKHJ, PKHC, and PKFE (trade names, made by Union Carbide Corporation); MPR-TA, MPR-TA5, MPR-TAL, MPR-TSN, MPR-TMF, MPR-TS, MPR-TM, and MPR-TAO (trade names, made by Nissin Kagaku Kogyo K.K.); 1000W, DX80, DX81, DX82, DX83, and 100FD (trade names, made by Denki Kagaku KOGYO K.K.); MR-104, MR-105, MR110, MR100, and 400X110A (trade names, made by Nippon Zeon Co., Ltd.); Nippollan N2301, Nippollan N100, and Nippollan N2304 (trade names, made by NIPPON POLYURETHANE CO., LTD.); Pandex T-5105, Pandex TR3080, Pandex T-5201, Burnock D-400, Burnock D-210-80, Crisvon 6109, and Crisvon 7209 (trade names, made by DAINIPPON INK AND CHEMICALS, INC.); Vylon UR-8200, UR-8300, UR-8600, UR-5500, UR-4300, RV 530, RV 280, and FB-84 (trade names, made by TOYOBO CO., LTD.); Daipheramine 4020, 5020, 5100, 5300, 9020, 9022, and 7020 (trade names, made by DAIN-ICHISEIKA COLOR & CHEMICALS MFG. CO., LTD.); MX 5004 (trade name, made by MITSUBISHI KASEI CORPORATION); Sunprene SP-150, TIM-3003, and TIM-3005 (trade names, made by SANYO CHEMICAL INDUSTRIES, LTD.); Salan F310 and Salan F210 (trade names, made by Asahi Chemical Industry Co., Ltd.), etc.

In these binders, MR-104 and MR-110 are preferably used.

The magnetic recording medium of the present invention includes the case composed of two or more layers as described above. Accordingly, as a matter of course, the amount of the binder, the amounts of a vinyl chloride resin, a polyurethane resin, a polyisocyanate, or other resins of the binder, the molecular weight of each resin forming the magnetic layer, and amount of the polar groups, and/or the properties of the foregoing resins can be, if necessary, changed for the non-magnetic layer and the magnetic layer and also well-known techniques regarding the multilayer type magnetic layer can be applied.

For example, in the case of changing the amount of the binder between the upper layer and the lower layer, for reducing the formation of scratches at the surface of the magnetic layer, it is effective to increase the amount of the binder in the magnetic layer as the upper layer and for improving the head touch of the magnetic recording medium with a magnetic head, it is effective to increase the amount of the binder of other non-magnetic layer than the magnetic layer as the upper layer to impart a softness to the layer.

As the polyisocyanate being used in this invention, isocyanates such as tolylene diisocyanate, 4,4'-diphenylmethane diisocyanate, hexamethylene diisocyanate, xylylene diisocyanate, naphthylene-1,5- diisocyanate, o-toluidine diisocyanate, isophorone diisocyanate, triphenylmethne triisocyanate, etc.; the products of these isocyanates and polyalcohol, the polyisocyanates formed by the condensation of these isocyanates, etc., can be used.

As commercially available products of these isocyanates, there are Coronate L, Coronate HL, Coronate 2030, Coronate 2031, Millionate MR, and Millionate MTL (trade names, made by NIPPON POLYURETHANE CO., LTD.); Takenate D102, Takenate D-110N, Takenate D-200, and Takenate D-202 (trade names, made by Takeda Chemical Industries, Ltd.); Desmodur L, Desmodur IL, Desmodur N, and Desmodur HL (trade names, made by Sumitomo Bayer K.K.), etc.

They can be used singly or as a combination of two or more of them by utilizing the difference in the curing reactivities of them for both the non-magnetic layer and the magnetic layer as the upper layer.

As additives being used in the present invention, the additives having a lubricating effect, an antistatic effect, a dispersing effect, a plasticizing effect, etc., are used.

For example, molybdenum disulfide, tungsten disulfide, graphite, boron nitride, fluorinated graphite, silicone oil, a silicone having a polar group, a fatty acid-modified silicone, a fluorine-containing silicone, a fluorine-containing alcohol, a fluorine-containing ester, polyolefin, polyglycol, an alkylphosphoric acid ester and the alkali metal salt thereof, alkylsulfuric acid ester and the alkali metal salt thereof, polyphenyl ether, fluorine containing alkylsulfuric acid ester and the alkali metal salt thereof, the metal salt (Li, Na, K, Cu, etc.) of a monobasic fatty acid having from 10 to 24 carbon atoms (the fatty acid may contain an unsaturated bond or may be branched), monohydric, dihydric, trihydric, tetrahydric, pentahydric, and hexahydric alcohols having from 12 to 22 carbon atoms (the alcohol may contain an unsaturated bond or may be branched), alkoxyalcohols having from 12 to 22 carbon atoms, the mono-fatty acid esters, di-fatty acid esters, or tri-fatty acid esters composed of a monobasic fatty acid having from 10 to 24 carbon atoms (the fatty acid may contain an unsaturated bond or may be branched) and at least one of monohydric, dihydric, trihydric, tetrahydric, pentahydric, and hexahydric alcohols having from 12 to 22 carbon atoms (the alcohol may contain an unsaturated bond or may be branched), a monoalkyl ether fatty acid ester of an alkylene oxide polymer, fatty acid amides having from 8 to 22 carbon atoms, the aliphatic amines having from 8 to 22 carbon atoms can be used.

Specific examples thereof include butyl stearate, octyl stearate, amyl stearate, isooctyl stearate, octyl myristate, butoxyethyl stearate, anhydrosorbitan monostearate, anhydrosorbitan distearate, anhydrosorbitan tristearate, oleyl alcohol, and lauryl alcohol. Also, nonionic surface active agents such as alyleneoxide series nonionic surface active agents, glycerol series nonionic surface active agents, glycidol series nonionic surface active agents, alkylphenolethylene oxide addition products, etc.; cationic surface active agents such as cyclic amines, quaternary ammonium salts, hydantoin derivatives, heterocyclics, phosphoniums, sulfoniums, etc.; anionic surface active agents containing acid groups such as a carboxylic acid, sulfonic acid, phosphoric acid, a sulfuric acid group, a phosphoric acid ester group, etc.; and amphoteric surface active agents such as amino acids, aminosulfonic acids, sulfuric acid or phosphoric acid esters of amino alcohol, alkylbetaine type surface active agents, etc., can be also used.

These surface active agents are described in detail in *Kaimen Kasseizai Binran (Surface Active Agent Handbook)*, published by Sangyo Tosho K.K.

These lubricants, antistatic agents, etc., are not always 100% pure and may contain impurities such as isomers, unreacted components, side-reaction products, decomposition products, oxides, etc. The content of these impurities is preferably from 0 to 30%, and more preferably from 0 to 10%.

The kinds and the amounts of these lubricants and surface active agents being used in this invention can be respectively used for the non-magnetic layer and the magnetic layer. For example, it is considered that fatty acids each having a different melting point are used for the non-magnetic layer and the magnetic layer, respectively, to control oozing of the fatty acid onto the surface of the magnetic layer, the esters each having a different boiling point and a different polarity are used for the non-magnetic layer and the magnetic layer, respectively, to control oozing thereof onto the surface of the magnetic layer, that the amounts of the surface active agents are controlled for both the layers to improve the stability of coating, and that the addition amount of the lubricant is increased for the non-magnetic layer to improve the lubricating effect, although the using methods of them are not limited to the foregoing embodiments only.

Also, all or a part of the additives being used in the present invention may be added in any step of the production of the magnetic coating composition. For example, there are the case of mixing them with the ferromagnetic metal powder before the step of kneading, the case of adding in the kneading step of the ferromagnetic metal powder and the binder using a solvent, the case of adding them in the dispersing step of the ferromagnetic metal powder, the case of adding after dispersing the ferromagnetic metal powder, the case of adding them immediately before coating the coating composition, etc. Also, according to the purpose, the purpose is achieved, as the case may be, by coating all or a part of the additives after coating the magnetic layer by a simultaneous coating or successively coating the magnetic layer and the non-magnetic layer. Furthermore, according to the purpose, after calendering the magnetic recording medium produced or after slitting the magnetic recording medium produced, a lubricant can be coated on the surface of the magnetic layer.

Then, the non-magnetic layer formed between the magnetic layer and the non-magnetic support is described below in detail.

The inorganic non-magnetic powder being used for the non-magnetic layer can be selected from inorganic compounds such as metal oxides, metal carbonates, metal sulfates, metal nitrides, metal carbides, metal sulfides, etc. Examples of the inorganic compounds include α-alumina having an α-conversion of from 90 to 100%, β-alumina, γ-alumina, silicon carbide, chromium oxide, cerium oxide, α-iron oxide, red iron oxide, corundum, silicon nitride, titanium carbide, titanium oxide, silicon dioxide, tin oxide, magnesium oxide, tungsten oxide, zirconium oxide, boron nitride, zinc oxide, barium sulfate, and molybdenum disulfide, and they can be used singly or as a combination thereof. Particularly preferred inorganic compounds are α-alumina, red iron oxide, and chromium oxide. Calcium carbonate is undesirable since calcium carbonate becomes a source for supplying a water-soluble metal ion.

Specific examples of the inorganic non-magnetic powder include Nanotite (trade name, made by SHOWA DENKO K.K.); HIT-100 and ZA-G1 (trade names, made by Sumitomo Chemical Company, Limited); DPN-250, DPN-250BX, DPN-245, and DPN-270BX (trade names, made by Toda Kogyo K.K.); TTO-51B, TTO-55A, TTO-55B, TTO-55C, TTO-55S, TTO-55D, SN-100, E-270, and E-271 (trade names, made by ISHIHARA SANGYO KAISHA, LTD.); STT-40, STT-30D, STT-30, and STT-65C (trade names, made by Titan Kogyo K.K.); MT-100S, MT-100T, MT-150W, MT500B, MT-600B, MT-100F, and MT-500HD (trade names, made by TEIKA CORPORATION); FINEX-25, BF-1, BF-10, BF-20, and ST-M (trade names, made by Sakai Chemical Industry Co., Ltd.); DEFIC-Y and DEFIC-R (trade names made by DOWA MINING CO., LTD.); AS2BM and TiO2P25 (trade names, made by Nippon Aerosil K.K.), 100A and 500A (trade names, made by Ube Industries, Ltd.), and Y-LOP (trade name, made by Titan Kogyo K.K.) and burned product thereof.

The average particle size of the inorganic non-magnectic powder is preferably from 0.005 to 5 μm but the same effect can be obtained, if necessary, by combining with an inorganic non-magnetic powder having a different average particle size or by broadening the particle size distribution even in the case of using a single inorganic non-magnetic powder. Particularly preferred average particle size of the inorganic non-magnetic powder is from 0.01 μm to 0.2 μm. The tapping density thereof is from 0.05 to 2 g/ml, and preferably from 0.2 to 1.5 g/ml. The moisture content of the inorganic non-magnetic powder is from 0.1 to 5% by weight, and preferably from 0.2 to 3% by weight. The surface area of the inorganic non-magnetic powder is from 1 to 100 $m^2/g$, preferably from 5 to 50 $m^2/g$, and more preferably from 7 to 40 $m^2/g$. The crystallite sizes of the inorganic non-magnetic power are preferably from 0.01 μm to 2 μm. The oil absorption using DBP is from 5 to 100 ml/100 g, preferably from 10 to 80 ml/100 g, and more preferably from 20 to 60 ml/100 g. The specific gravity thereof is from 1 to 12, and preferably from 3 to 6. The form thereof may be an acicular form, a polyhedral form, or a tabular form.

It is preferred that the ignition loss of the inorganic non-magnetic powder is from 0 to 20% by weight. In this invention the inorganic non-magnetic powder having a Mohs' hardness of from 4 to 10 is preferably used. The roughness factor of the surface of the inorganic non-magnetic powder is preferably from 0.8 to 1.5, and more preferably from 0.9 to 1.2. The adsorption amount of SA (stearic acid) to the inorganic non-magnetic powder is from 1 to 20 $\mu mols/m^2$, and preferably from 2 to 15 $\mu mols/m^2$. The heat of wetting of the inorganic non-magnetic powder in the non-magnetic layer to water of 25° C. is preferably in the range of from 200 $erg/cm^{11}$ to 600 $erg/cm^2$. Also, a solvent which is in the range of the heat of wetting can be used. It is proper that the number of the water molecules on the surface at a temperature of from 100° to 400° C. is from 1 to $^{10}/_{100}$ Å. Also, it is preferred that pH of the isoelectric point thereof in water is between 3 and 6.

It is preferred that these surfaces of these non-magnectic powders are surface-treated with $Al_2O_3$, $SiO_2$, $TiO_2$, $ZrO_2$, $SnO_2$, $Sb_2O_3$, or ZnO. In particular, $Al_2O_3$, $SiO_2$, $TiO_2$, and $ZrO_2$ are preferred for the dispersibility of the inorganic non-magnetic powder and $Al_2O_3$, $SiO_2$, and $ZrO_2$ are more preferred.

They may be used as a combination thereof but can be used singly. Also, according to the purpose, the layer of the inorganic non-magnetic powder surface treated by a coprecipitation may be used, a method of treating the surface of the inorganic non-magnetic powder with alumina and thereafter treating the surface layer with silica or the reverse method can be employed. Also, according to the purpose, the surface treated layer may be a porous layer but a uniform and densified layer is generally preferred.

By incorporating carbon black to the non-magnetic layer, R, can be lowered, which is a known effect. For the purpose, furnace black for rubbers, thermal black for rubbers, carbon black for color, acetylene black, etc., can be used. The specific area of the carbon black is from 100 to 500 $m^2/g$, and preferably from 150 to 400 $m^2/g$. The DBP oil absorption is from 20 to 400 ml/100 g, and preferably from 30 to 200 ml/100 g. The average particle size of the carbon black is from 5 mμ to 80 mμ, preferably from 10 mμ to 50 mμ, and more preferably from 10 mμ to 40 mμ. Also, it is preferred that pH of the carbon black is from 2 to 10, the moisture content thereof is from 0.1 to 10%, and the tapping density is from 0.1 to 1 g/ml.

Specific examples of the carbon black being used in this invention include BLACKPEARLS 2000, 1300, 1000, 900, 800, 880, 700, and VULCAN XC-72 (trade names, made by Cabot Corporation); #3050B, #3150B, #3250B, #3750B, #3950B, #950, #650B, #970B, #850B, and MA-600 (trade names, made by MITSUBISHI KASEI CORPORATION); CONDUCTEX SC RAVEN 8800, 8000, 7000, 5750, 5250, 3500, 2100, 2000, 1800, 1500, 1255, and 1250 (trade names, made by Columbia Carbon Co., Ltd.), and Ketjen Black EC (trade name, made by Akzo Co., Ltd.)

The carbon black may be surface-treated with a dispersing agent or grafted with a resin at use, or further the carbon black a part of the surface of which is graphitized may be used. Also, before adding the carbon black to the coating composition, the carbon black may be preciously dispersed with a binder. The carbon black can be used in the range of from 0 to 50% by weight to the amount of the foregoing inorganic non-magnetic powder and in the range of from 0 to 40% by weight of the total amount of the non-magnectic layer. These carbon blacks can be used singly or as a combination thereof.

For the carbon blacks which can be used for the non-magnectic layer in this invention, *Carbon Black Binran* (*Handbook*), edited by the Carbon Black Society can be referred to.

Also, to the non-magnetic layer can be added the inorganic powder as described above in regard to the magnetic layer according to the purpose.

As the binder for the non-magnetic layer, the lubricant, the dispersing agent, the solvent, the dispensing method, and others for the non-magnetic layer, those described above for the magnetic layer can be applied. In particular, about the amount and the kind of the binder, the additives, the addition amount and the kind of the dispersing agent, etc., the well-known techniques in regard to the magnetic layer described above can be applied.

As the organic solvent being used in this invention, ketones such as acetone, methyl ethyl ketone, methyl isobutyl ketone, diisobutyl ketone, cyclohexanone, isophorone, tetrahydrofuran, etc.; alcohols such as methanol, ethanol, propanol, butanol, isobutyl alcohol, isopropyl alcohol, methylcyclohexanol, etc.; esters such as methyl acetate, butyl acetate, isobutyl acetate, isopropyl acetate, ethyl lactate, acetic acid glycol, etc.; glycol ethers such as glycol dimethyl ether, glycol monoethyl ether, dioxane, etc.; aromatic hydrocarbons such as benzene, toluene, xylene, cresol, chlorobenzene, etc.; chlorinated hydrocarbons such as methylene chloride, ethylene chloride, carbon tetrachloride, chloroform, ethylenechlorohydrin, dichlorobenzene, etc.; N,N-dimethylformamide, hexane, etc., can be used at an optional ratio.

These organic solvents are not always 100%-pure and may contain impurities such as an isomer, an unreacted components, side reaction products, decomposed products, oxides, water, etc., in addition to the main components. The content of these impurities is preferably from 0 to 30%, and more preferably from 0 to 10%.

It is preferred that the kind of the organic solvent being used in this invention is same for the magnetic layer and for the non-magnetic layer. By using a solvent having a high surface tension (cyclohexane, dioxane, etc.) for the non-magnetic layer, the stability of coating can be increased. Practically, it is necessary that the arithmetic average value of the solvent composition for the upper magnetic layer is not lower than the arithmetic average value of the solvent composition of the non-magnetic layer. For improving the dispersibility, it is preferred that the polarity is strong to some extent. In the solvent composition, it is preferred that a solvent having a dielectric constant of from 15 to 25 is contained in an amount of from 50 to 80%. Also, the solvent parameter is from 8 to 11.

In the case of the magnetic recording tape, in the thickness construction of the magnetic recording medium of this invention, the thickness of the non-magnetic support is from 1 to 20 µm but in particular, the thin non-magnetic support having a thickness of from 4 to 10 µm is effectively used. In the case of a magnetic disk, the thickness of the non-magnetic support is usually from 50 to 70 µm.

The thickness of the single magnetic layer or the total thickness of the upper magnetic layer and the non-magnectic layer is in the range of from 1/100 to 1/1 times the thickness of the non-magnetic support. In the case of the single magnetic layer, the thickness of the layer is usually from 0.7 to 4.0 µm, and preferably from 1.5 to 3.5 µm. In the case of the upper magnetic layer and the non-magnetic layer, the thickness of the upper magnetic layer is usually from 0.1 to 1.5 µm, and preferably from 0.1 to 0.5 µm and the thickness of the non-magnetic layer is usually from 0.8 to 3.5 µm, and preferably from 1.2 to 3.0 µm.

Also, an adhesive layer is formed between the non-magnetic support and the non-magnetic layer for improving the adhesion of the non-magnetic support and the non-magnetic layer. The thickness of the adhesive layer is from 0.005 to 0.5 µm, and preferably from 0.02 to 0.3 µm.

Furthermore, a back coat layer may be formed on the surface of the non-magnetic support opposite to the magnetic layer side. The thickness of the back coat layer is from 0.1 to 2 µm, and preferably from 0.3 to 1.0 µm.

As these adhesive layer and the back coat layer, well-known layers can be used.

The total thickness of the magnetic recording medium including these adhesive layer and back coat layer is from 5 to 25 µm, and preferably from 5 to 20 µm in the case of the magnetic recording tape, and is usually from 60 to 80 µm in the case of the magnetic disk.

As the flexible non-magnetic support (hereinafter, is referred to as non-magnetic support) being used in this invention, the films of well-known polymers such as biaxially stretched polyethylene terephthalate, polyethylene naphthalate, polyamide, polyimide, polyamidoimide, aromatic polyamide, polybenzoxazole, etc., can be used. In particular, the non-magnetic support using polyethylene terephthalate, polyethylene naphthalate, or an aramid resin is preferred. The micro Vickers hardness of the non-magnetic support is preferably from 75 to 100 kg/mm², and the hardness is obtained by controlling the heating condition, the relaxing condition, the stretching condition, etc., at firm firming and selecting the material of the non-magnetic support.

To the non-magnetic support may be previously applied a corona discharging treatment, a plasma treatment, an easy adhesion treatment, a heat treatment, a dust-removing treatment, etc.

The center line average surface roughness of the non-magnetic support of this invention is from 0.001 to 0.03 µm, preferably from 0.001 to 0.02 µm, and more preferably from 0.001 to 0.01 µm. Also, the non-magnetic support has not only the low center line average surface roughness but also does not have coarse projections having a size of higher than 1 µm. Also, the rough form of the surface of the non-magnectic support can be desirably controlled with the sizes and the amount of a filler, which is added to the non-magnectic support according to the requirement. As examples of the filler, there are oxides and carbonates of Al, Ca, Si, Ti, etc., which may be crystalline or noncrystalline, and organic fine powders of acrylic polymers, melamine series polymers.

The F-5 value of the non-magnetic support being used in this invention in the tape running direction is preferably from 10 to 50 kg/mm² and the F-5 value thereof in the tape width direction is preferably from 10 to 30 kg/mm². Also, the coefficient of heat shrinkage of the non-magnetic support at 100° C. for 30 minutes in the tape running direction and the width direction is preferably from 0 to 3%, and more preferably from 0 to 1.5% and the coefficient of heat shrinkage at 80° C. for 30 minutes is preferably from 0 to 1%, and more preferably from 0 to 0.5%. The breaking strength of the non-magnetic support in both the directions is from 5 to 100 kg/mm² and the modulus of elasticity thereof is preferably from 100 to 2,000 kg/mm².

The process of producing the magnetic coating composition for the magnetic recording medium of this invention is composed of at least a kneading process, a dispersing process, and a mixing process which is carried out, if necessary, before and after the foregoing processes. Each process may be separated into two or more steps.

All the raw materials such as the ferromagnetic powder, the binder, the carbon black, the abrasive, the antistatic agent, the lubricant, the solvent, etc., may be added at the beginning or at the intermediate step of any process. Also, each raw material may be added in two or more processes separately. For example, polyurethane may be split into plural portions and they may be separately added in the kneading process, the dispersing process, and the mixing process for controlling the viscosity after dispersing. For attaining the objects of the present invention, conventionally well-known production techniques can, as a matter of course, be used as a part of the processes of this invention but in the kneading process, it is preferred to obtain high Br of the magnetic recording medium by using a kneader having a strong kneading force, such as a continuous kneader, a compressing kneader, etc. In the case of using the continuous kneader or the compressing kneader, all or a part of the binders (at least 30% by weight of all the binders is preferred) are kneaded with the ferromagnetic metal powder in the range of from 15 to 500 parts by weight to 100 parts by weight of the ferromagnetic metal powder. The details of the kneading treatment are described in U.S. Pat. Nos. 4,946,615 and 5,300,244. Also, in the case of preparing the coating solution for the non-magnetic layer, it is desirable to use dispersing media having a high specific gravity and zirconia beads are suitably used.

As examples of the apparatus and the method of coating the magnetic recording medium of a multilayer structure as in this invention, the following constructions are proposed.

1. First, the lower layer is coated a gravure coating apparatus, a roll coating apparatus, a blade coating apparatus, an extrusion coating apparatus, etc., which are generally used for coating magnetic coating solutions and while the lower layer is a wet state, the upper magnetic layer is coated by a compression-type extrusion coating apparatus on a support as disclosed in U.S. Pat. Nos. 4,480,583, 4,681,062 and 5,302,206.

2. The upper and lower layers are almost simultaneously coated by one coating head including two slits for passing coating solutions as disclosed in U.S. Pat. Nos. 4,854,262, 5,030,484 and 5,302,206.

3. The upper layer and the lower layer are almost simultaneously coated by the back up roll-attached extrusion coating apparatus disclosed in JP-A-2-174965.

In addition, for preventing decrease of the electromagnetic characteristics of the magnetic recording medium by the aggregation of the ferromagnetic metal powder, it is desirable to impart shearing to the coating solution in the inside of a coating head by the method described in U.S. Pat. No. 4,828,779 and JP-A-1-236968. Furthermore, it is preferred that the viscosity of the coating solution satisfies the numeral value range disclosed in U.S. Pat. No. 4,994,306.

For obtaining the magnetic recording medium of the present invention, it is necessary to apply a strong orientation. In this case, it is preferred to use together a solenoid magnet of 1,000 gausses and cobalt magnet of 2,000 gausses with opposed same poles and further, it is preferred to preciously apply a proper drying process before the orientation such that the orientation after drying becomes highest.

Also, when the present invention is applied to a disk medium, the orientation method of rather randomizing the orientation is necessary. Also, in the case of existing plural magnetic layers, the orientation direction of each layer can be changed. For example, the orientation can be applied not only to the inplane direction of the surface but also in the perpendicular direction and the width direction of the magnetic layers.

Furthermore, as the calender treatment rolls, various metal rolls or heat-resisting plastic rolls of an epoxy resin, a polyimide resin, a polyamide resin, a polyimidoamide resin, etc., are used. In the present invention, it is particularly preferred to treat by metal rolls each other. The treatment temperature is preferably from 70° to 120° C., and more preferably from 75° to 90° C. The line pressure is preferably from 250 to 500 kg/cm, and more preferably from 300 to 400 kg/cm.

The coefficient of friction of the surface of the magnetic recording medium in the present invention and of the opposite surface thereof to SUS 420J is preferably from 0.1 to 0.5, and more preferably from 0.15 to 0.3, the surface inherent resistance is preferably from $10^4$ to $10^{12}$ ohms/sq., the modulus of elasticity of the magnetic layer at 0.5% stretching in both the running direction and the width direction is preferably from 100 to 2,000 kg/mm², the breaking strength is preferably from 1 to 30 kg/cm², the modulus of elasticity of the magnetic recording medium in both the running direction and the width direction is preferably 100 to 1,500 kg/mm², the residual elongation is preferably from 0 to 0.5%, and the coefficient of heat shrinkage at all the temperature of not more than 100° C. is preferably from 0 to 1%, more preferably from 0 to 0.5%, and most preferably from 0 to 0.1%.

The glass transition temperature (the maximum point of the loss elastic modulus at dynamic viscoelastic measurement measured at 110 Hz) of the magnetic layer is preferably from 50° C. to 120° C. and the glass transition temperature of the non-magnetic layer is preferably from 0° C. to 100° C.

The loss elastic modulus is preferably in the range of from $1 \times 10^8$ to $8 \times 10^9$ dyne/cm² and the loss tangent is preferably from 0 to 0.2. If the loss tangent is too large, sticking troubles are liable to cause.

The content of the residual solvent contained in the magnetic layer is preferably from 0 to 100 mg/m², and more preferably from 0 to 10 mg/m$^{11}$ and it is preferred that the content of the residual solvent contained in the upper magnetic layer is less than the content of the residual solvent contained in the non-magnetic layer. The voids of both the magnetic layer and the non-magnetic layer is preferably from 0 to 30% by volume, and more preferably from 0 to 20% by volume. The voids is preferably small for obtaining a high output but according to the purpose, it is better, as the case may be, to insure a certain value of the voids. For example, in the magnetic recording medium for data recording, wherein a repeated use is regarded as important, the large voids is frequently preferred for the running durability.

When the magnetic characteristics of the magnetic recording medium of the present invention are measured at a magnetic field of 5 kOe, the squareness ratio in the tape running direction is from 0.70 to 1.00, preferably from 0.80 to 1.00, and more preferably from 0.90 to 1.00. The squareness ratios in the two directions perpendicular to the tape running direction are preferably not more than 80% of the squareness ratio in the running direction. SFD of the magnetic layer is preferably from 0.1 to 0.6.

The center line surface roughness (Ra) of the magnetic layer is preferably from 1 nm to 10 nm but the value thereof shall be properly established according to the purpose. For improving the electromagnetic characteristics, Ra is preferably smaller.

The magnetic recording medium of the present invention can have a non-magnetic layer and a magnetic layer as an upper layer and it can be easily presumed that the physical properties can be changed between the non-magnetic layer and the magnetic layer according to the purposes. For example, the modulus of elasticity of the magnetic layer is increased to improve the running durability and at the same time the modulus of the non-magnetic layer is lowered than that of the magnetic layer to improve the contact of the magnetic recording medium with a magnetic head, etc.

EXAMPLE

Then, the present invention is practically explained by the following examples and comparative examples, wherein all parts, unless otherwise indicated, are by weight.

Example 1

| Non-magnetic Layer: | |
|---|---|
| Inorganic non-magnetic powder | 85 parts |
| TiO₂ crystal rutile | |
| Average primary particle size: 0.035 μm | |
| Specific surface area by BET method: 40 m²/g | |
| pH: 7.0 | |
| TiO₂ Content: 90% or more | |
| DBP Oil absorption: 27 to 38 g/100 g | |
| Surface treating agent: Al₂O₃ | |
| Carbon Black | 15 parts |
| Average primary particle size: 16 mμ | |
| DBP Oil absorption: 80 ml/100 g | |
| pH: 8.0 | |
| Specific surface area by BET method: 250 m²/g | |
| Volatile matter: 1.5% | |
| Vinyl Chloride Copolymer | 14 parts |
| MR 110 (made by Nippon Zeon Co., Ltd.) | |
| containing —SO₃Na and epoxy groups | |
| Polymerization degree: 300 | |
| Polyesterpolyurethane Resin A | 5 parts |
| Neopentyl glycol/caprolactonepolyol/ | |
| 4,4'-diphenylmethanediisocyanate = | |
| 0.9/2.6/1 | |

-continued

| | |
|---|---|
| containing —SO$_3$Na group (content: 1 × 10$^{-4}$ eq/g) | |
| Butyl Stearate | 1 part |
| Stearic Acid | 1 part |
| Methyl ethyl ketone | 150 parts |
| Cyclohexanone | 50 parts |

Magnetic Layer (Upper magnetic layer)

| | |
|---|---|
| Ferromagnetic Metal Powder | 100 parts |
| Coercive force: 1900 Oe | |
| $\sigma_s$: 139 emu/g | |
| Specific surface area: 57.5 m$^2$/g | |
| Crystallite size: 190 Å | |
| Average particle size: 0.08 µm | |
| (long axis diameter) | |
| Acicular ratio: 4.0 | |
| Vinyl Chloride Series Copolymer | 13 parts |
| MR 110 (made by Nippon Zeon Co., Ltd.) | |
| Polyesterpolyurethane | 5 parts |
| Resin A described above | |
| α-Al$_2$O$_3$ (average particle size 0.23 µm) | 12.5 parts |
| Carbon Black | 0.5 part |
| (average particle size 0.3 µm) | |
| Butyl Stearate | 1.0 part |
| Stearic Acid | 0.5 part |
| Methyl ethyl ketone | 150 parts |
| Cyclohexanone | 50 parts |

About each of the coating compositions described above, after kneading the components by a continuous kneader, the kneaded mixer was dispersed using a sand mill. To the dispersion (coating solution) for the non-magnetic layer thus obtained was added 5.5 parts of polyisocyanate ("Coronate L" made by NIPPON POLYURETHANE CO., LTD.) and to the coating solution for the upper magnetic layer thus obtained was added 5 parts of the polyisocyanate and after further adding 40 parts of butyl acetate to each coating solution, each coating solution was filtrated using a filter having pores of an average pore size of 1 µm to provide the coating solutions for the non-magnetic layer and the magnetic layer, respectively.

The coating solution for the non-magnetic layer and immediately thereafter the coating solution for the magnetic layer were almost simultaneously double-coated on a non-magnetic support [ST type of polyethylene terephthalate (PET)] having a thickness of 7 µm and a center line surface roughness of 0.01 µm at dry thickness of 2.7 µm and 0.3 µm, respectively, and while both the layers were in a wet state, the magnetic layer was double stage-oriented by cobalt magnets having 3,000 gausses (1st stage) and a solenoid having 1,500 gausses (2nd stage) followed by drying.

The surface treatment of the magnetic layer of the magnetic recording medium was carried out using the apparatus shown in FIG. 3 and using a diamond wheel having a surface roughness of 0.5 µm. The treatment condition was at travelling velocity V of the medium=7 meters/second and at T$_2$-T$_1$ tension=80 g/8 mm.

The magnetic recording medium thus prepared was slit into a width of 8 mm to produce an 8 mm video tape.

Comparative Example 1

By following the same procedure as Example 1 except that the particle size and the addition amount of α-alumina being added to the magnetic layer, and the coated layer thicknesses of the magnetic layer and the non-magnetic layer were changed as shown in Table 1 below, an 8 mm video tape was produced.

Examples 2 to 4 and Comparative Examples 2 and 3

By following the same procedure as Example 1 except that the particle sizes and the addition amounts of α-alumina and carbon black in the magnetic layer, and the coated layer thicknesses of the magnetic layer and the non-magnetic layer were changed as shown in Table 1 below, and also the surface treatment of the magnetic layer by a diamond wheel in Example 1 was changed to the surface treatment shown below, 8 mm video tapes were prepared.

(Surface Treatment)

Example 2: A diamond wheel having a surface roughness of 1.0 µm was used.

Example 3 and 4: No surface treatment.

Comparative Examples 2 and 3:
Calender treatment was applied under the conditions of a calender temperature of 90° C., a line pressure of 350 kg, and 7 stage metal calender rolls.

Example 5 and Comparative Examples 4 to 9

By following the same procedure as Example 1 except that the particle size and the addition amount of α-alumina being used for the magnetic layer as an abrasive and the coated layer thicknesses of the magnetic layer and the non-magnectic layer were changed as shown in Table 1 below, and the surface treatment, etc., by the diamond wheel was changed as shown below, 8 mm video tapes were produced.

(Changed Points)

Example 5: No surface treatment.

Comparative Example 4: No surface treatment.

Comparative Example 5:
A calender treatment was applied under the conditions of a calender temperature of 90° C., a line pressure of 350 kg, and 7 stage metal calender rolls.

Comparative Example 6:
Carbon black was not added to the magnetic solution and after kneading and dispersing the magnetic solution, carbon black was added thereto.

Comparative Example 7: No surface treatment.

Comparative Example 8:
The support used was changed to the ST type of polyethylene naphthalate.

Comparative Example 9: No surface treatment.

Examples 6 to 8 and Comparative Example 10

By following the same procedure as Example 3 except that the addition amounts of the abrasive and the carbon black used in the magnetic layer were changed as shown in Table 1 below, as the support, the following polymers were used, and the surface treatment was carried out as follows, 8 mm video tapes were produced.

(Surface Treatment and Support)

Example 6:
A BO type of polyethylene naphthalate having a thickness of 5.5 µm was used and no surface treatment.

Example 7:
An ST type of polyethylene terephthalate having a thickness of 7.0 µm was used and no surface treatment.

Example 8:
An ST type of polyethylene terephthalate having a thickness of 7.0 µm was used and no surface treatment.

Comparative Example 10:
An ST type of polyethylene terephthalate having a thickness of 7.0 µm was used and no surface treatment.

Examples 9 and 10

By following the same procedure as Example 2 except that the particle size and the addition amount of α-alumina and the carbon black being used for the magnetic layer were changed as shown in Table 1 below and further the surface treatment was not applied, 8 mm video tapes were produced.

TABLE 1 (1)

|  | (A) (μ) | Abrasive | | Carbon Black | |
|---|---|---|---|---|---|
|  |  | (B) (μ) | (C) | (B) (μ) | (C) |
| Example 1 | 0.3/2.7 | 0.23 | 125 g | 0.3 | 50 g |
| Example 2 | 0.3/2.7 | 0.23 | 125 g | 0.08 | 10 g |
| Example 3 | 0.8/2.2 | 0.23 | 80 g | 0.08 | 5 g |
|  |  | 0.32 | 20 g |  |  |
| Example 4 | 0.4/2.5 | 0.23 | 10 g | 0.08 | 15 g |
| Example 5 | 0.3/2.7 | 0.23 | 125 g | 0.08 | 10 g |
| Example 6 | 0.8/2.2 | 0.23 | 70 g | 0.08 | 3 g |
|  |  | 0.32 | 30 g |  |  |
| Example 7 | 0.8/2.2 | 0.23 | 70 g | 0.08 | 3 g |
|  |  | 0.32 | 30 g |  |  |
| Example 8 | 0.8/2.2 | 0.23 | 70 g | 0.08 | 3 g |
|  |  | 0.32 | 30 g |  |  |
| Example 9 | 0.3/2.7 | 0.18 | 75 g | 0.08 | 10 g |
| Example 10 | 0.3/2.7 | 0.18 | 75 g | 0.08 | 5 g |

In the above table:
(A): Thickness of upper layer/lower layer.
(B): Average particle size
(C): Addition amount (/kg-magnetic powder)

TABLE 1 (2)

|  | (A) (μ) | Abrasive | | Carbon Black | |
|---|---|---|---|---|---|
|  |  | (B) (μ) | (C) | (B) (μ) | (C) |
| C. Example 1 | 0.4/2.5 | 0.32 | 10 g | 0.3 | 50 g |
| C. Example 2 | 0.4/2.5 | 0.20 | 150 g | 0.06 | 2 g |
| C. Example 3 | 0.4/2.5 | 0.20 | 50 g | 0.06 | 2 g |
| C. Example 4 | 0.3/2.7 | 0.25 | 150 g | 0.08 | 10 g |
| C. Example 5 | 0.3/2.7 | 0.25 | 150 g | 0.06 | 5 g |
| C. Example 6 | 0.3/2.7 | 0.23 | 125 g | 0.08 | 10 g |
| C. Example 7 | 0.3/2.7 | 0.23 | 125 g | 0.3 | 60 g |
| C. Example 8 | 0.3/2.7 | 0.23 | 125 g | 0.08 | 10 g |
| C. Example 9 | 0.8/2.2 | 0.23 | 70 g | 0.08 | 3 g |
|  |  | 0.32 | 30 g |  |  |
| C. Example 10 | 0.8/2.2 | 0.23 | 70 g | 0.08 | 3 g |
|  |  | 0.32 | 30 g |  |  |

In the above table, C. Example is Comparative Example and other abbreviations are same as those in Table 1 (1).

Example 11

In Example 9 described above, the upper magnetic layer only was coated on a support and in this case Tg of polyurethane was changed to 20° C., the addition amount of carbon black to 20 g, and further the thickness of the magnetic layer to 2.4 μm. The magnetic tape obtained was subjected to a calender treatment (calender treatment temperature 90° C., the line pressure 350 kg, and 7 stage metal calender rolls), and further the surface treatment as in Example 2 was applied.

Each of the samples of 8 mm video tapes (Examples 1 to 11 and Comparative Examples 1 to 10) obtained described above was evaluated as follows.
Evaluation Methods:
[Measurement Method of Thickness of Magnetic Layer]
Case of Nonmagnetic Layer+Upper Magnetic Layer:

Each of the magnetic recording media was cut down by a diamond cutter along the lengthwise direction at a thickness of about 0.1 μm, observed by a transmission type electron microscope at 30,000 magnifications and photographed.

The print size of the photograph was A4 size (210 mm×297 mm). Thereafter, the differences of the form of the ferromagnetic metal powder of the magnetic layer and the form of the inorganic non-magnetic powder of the nonmagnetic layer were viewed, the interface was visually decided and fringed with black, and the surface of the magnetic layer was also similarly fringed with black. Thereafter, the distance between the fringed lines was measured by an image processing apparatus, IBAS2, made by Carl Zeiss Stiftung. The length of the sample photograph extended to the range of 21 cm and the measuring points were measured. The simple addition average value of the measured values of this case was defined as the thickness of the magnetic layer.

[Magnetic Characteristics, Hc, Br, and Squareness Ratio]

They were measured using a vibration sample type fluxmeter (made by Toei Kogyo K.K.) at Hm of 10 kOe.

[Average Particle Sizes of Ferromagnetic Metal Powder and Inorganic Non-magnetic Powder]

By properly using a method of photographing a transmission type electron microscopic photograph and directly reading the short axis diameter and the long axis diameter of the ferromagnetic metal powder from the photograph and a method of reading the transmission type microscopic photograph by tracing the photograph by an image analyzing apparatus, IBASSI, made by Carl Zeiss Stiftung together, the average particle size was obtained.

[Crystallite Size of Ferromagnetic Metal Powder]

The crystallite size was obtained from the extension of the half width of the diffraction lines of the (1,1,0) plane and the (2,2,0) plane by X ray diffraction.

[Metal Components in Ferromagnetic Metal Powder]

In an aqueous solution of 6N HCl was dissolved 5 g of a ferromagnetic metal powder sample, metals in the solution were analyzed by an atomic absorption spectrometry and the atomic % to Fe was determined.

[Measurement of Components and Sizes of Projections on the Surface of Magnetic Layer]

The discrimination of the foregoing "abrasive projections" and "non-abrasive projections" was carried out by an electron probe X-ray micro anylyzer (EPMA) analysis of specific X-ray of the electron rays irradiated to the projected potion. By comparing the spectrum obtained by irradiating other magnetic layer surface than the projection portions with the spectrum from the projection portions, they were decided by the observations of the type and the form of the detected amount of the inorganic element constituting the abrasive. Practically, by comparing the detected amount of the Al element when the abrasion was $Al_2O_3$, the detected amount of the Cr element when the abrasive was $Cr_2O_3$, and the detected amount of the Si element when the abrasive was SiC or $SiO_2$, the component and the size could be determined. Also, carbon black or an organic filler powder could be determined by the form observation and by comparing the detected amount of the C element.

The existing density ($K_t$) of the projections of the abrasive was confirmed by a scanning type electron microscope. Also, the existing density of the projections of K10, M20, M40, etc., requiring the information of the direction of height was confirmed by an atomic force microscope (AFM).

[Measurement of Stiffness]

The measurement of the stiffness was carried out on a sample cut into a size of 8 mm×8 mm using a kinematic strain meter (CPC-1D) manufactured by Chuoo Seiki K.K.

In the measurement, the stiffness in the lengthwise direction (MD) and the stiffness in the width direction (TD) were shown.

[Measurement of Dynamic Viscoelastic Modulus]

The measurement of the dynamic viscoelastic modulus was carried out by "RHEOVIBRON DDV-II-A" manufactured by Toyo Boldwin K.K. at an exciting frequency of 110 Hz.

Evaluation Terms:

[Abrasion Resistance of Magnetic Layer (Abrasion Loss of Steel Ball)]

By repeatedly running a steel ball having a diameter of ¼ inch on the magnetic layer 20 times in the distance of 20 mm (20×20=400 mm) while applying a load of 50 g onto the steel ball under the conditions of 5° C. and 80% RH. and the volume (abrasion loss) of the steel ball abraded by the contact with the magnetic layer was determined.

[Virgin $H_w$]

Each of five video tape cassettes each containing a video tape of 120 minute long was mounted, in turn, on a video deck, EVO-9500 (trade name, manufactured by Sony Corporation), each tape was continuously run at full tape length under the atmosphere of 5° C. and 80% RH. and the change (μm) of the projection amount of the head before and after running was measured by an optical microscope, Hisomet (trade name, manufactured by Union Co.).

[Repeated $H_w$]

One same video tape of 120 minute long was repeatedly run at ten times using the video deck, EVO-9500 under the atmosphere of 5° C. and 80% RH and the change of the projections of the head before and after running was measured by an optical microscope, Hisomet described above.

[Reproducing Output of 7 MHz]

A signal of 7 MHz was recorded using an 8 mm video deck, FUJIX 8 (trade name, manufactured by Fuji Photo Film Co., Ltd.) and the reproduced output of the signal of 7 MHz when the signal was reproduced was measured by an oscilloscope. The reference was an 8 mm video tape, SAG, P6-120, manufactured by Fuji Photo Film Co., Ltd.

The reproduction output before storing is preferably at least 5 dB.

[Still]

Using the same video deck as used in the reproduction output test described above, an image was reproduced in a still mode and the time until the reproduced image was deteriorated was measured.

[Mg μ Value] (coefficient of friction)

Each tape was laid on a steel rod, SUS 420J having a diameter of 4 mm at an angle of 180 degree, the tape was slided at a load of 20 g and a speed of 14 mm/second, and the coefficient of friction as obtained based on the Euler's equation.

$\mu = (1/\pi) ln(T_2/10)$   $T_2$: Slide resistance (g)

In addition, the coefficient of friction when the tape was initially laid (1P) and the coefficient of friction when the tape was laid 100 times were shown and the incase and decrease thereof were shown.

The results of evaluating each of the samples are shown in Table 2 to Table 5 below.

TABLE 2

|  |  | Ex 1 | C. Ex 1 | Ex 2 | Ex 3 | Ex 4 |
|---|---|---|---|---|---|---|
| $K_t$ [nos./μm²] | | 0.35 | 0.08 | 0.36 | 0.75 | 0.1 |
| K10 [nos./μm²] | | 0.09 | 0.06 | 0.03 | 0.05 | 0.0 |

TABLE 2-continued

|  |  | Ex 1 | C. Ex 1 | Ex 2 | Ex 3 | Ex 4 |
|---|---|---|---|---|---|---|
| M20 [nos./μm²] | | 2.2 | 2.2 | 0.29 | 0.133 | 0.56 |
| M40 [nos./μm²] | | 0.027 | 0.026 | 0.01 | 0.01 | 0.0 |
| K10/M20 | | 0.04 | 0.027 | 0.103 | 0.376 | 0.018 |
| Micro Stiffness [mmg] | MD | 110 | 107 | 112 | 112 | 110 |
|  | TD | 60 | 62 | 60 | 60 | 60 |
| (a) | | 2 | 2 | 2 | 2 | 2 |
| (b) | | 1.25 | 0.3 | 1.25 | 1.65 | 0.7 |
| (c) | | 0.05 | 0.03 | 0.5 | 0.8 | 0.0 |
| (d) | | 0.1 | 0.05 | 1.5 | 3.0 | 0.08 |
| 7M Output (dB) | | 3.0 | 3.2 | 6.1 | 6.3 | 5.5 |
| Still | | more than 2 hrs. | 2 min. | more than 2 hrs. | more than 2 hrs. | 2 hrs. |
| Mag μ Value | 1 P | 0.19 | 0.19 | 0.24 | 0.26 | 0.2 |
|  | 100 P | 0.20 | 0.24 | 0.24 | 0.26 | 0.2 |
|  | Rise | none | little | none | none | none |

TABLE 3

|  |  | C. Ex 2 | C. Ex 3 | Ex 5 | C. Ex 4 | C. Ex 5 |
|---|---|---|---|---|---|---|
| $K_t$ [nos/μm²] | | 1.1 | 0.34 | 0.36 | 0.33 | 0.8 |
| K10 [nos/μm²] | | 0.06 | 0.05 | 0.15 | 0.22 | 0.008 |
| M20 [nos/μm²] | | 0.05 | 0.04 | 0.27 | 0.30 | 0.10 |
| M40 [nos/μm²] | | 0 | 0 | 0 | 0 | 0 |
| K10/M20 | | 1.2 | 1.25 | 0.56 | 0.73 | 0.08 |
| Micro Stiffness [mmg] | MD | 112 | 112 | 112 | 112 | 112 |
|  | TD | 62 | 62 | 62 | 62 | 62 |
| (a) | | 2 | 2 | 2 | 2 | 2 |
| (b) | | 1.85 | 1.25 | 1.25 | 1.25 | 1.25 |
| (c) | | 2.2 | 1.6 | 0.8 | 1.0 | 1.1 |
| (d) | | 5.0 | 2.5 | 2.8 | 2.9 | 4.5 |
| 7M Output (dB) | | 6.5 | 6.5 | 6.0 | 5.8 | 6.3 |
| Still | | more than 2 hrs. | more than 2 hrs. | more than 2 hrs. | 30 min. | more than 2 hrs. |
| Mag μ Value | 1 P | 0.34 | 0.37 | 0.24 | 0.23 | 0.32 |
|  | 100 P | 0.35 | 0.40 | 0.32 | 0.35 | 0.34 |
|  | Rise | none | slight | little | large | none |

TABLE 4

|  |  | C. Ex 6 | C. Ex 7 | C. Ex 8 | C. Ex 9 | Ex 6 | Ex 7 |
|---|---|---|---|---|---|---|---|
| $K_t$ [nos/μm²] | | 0.34 | 0.35 | 0.36 | 0.75 | 0.75 | 0.75 |
| K10 [nos/μm²] | | 0.03 | 0.02 | 0.03 | 0.08 | 0.08 | 0.08 |
| M20 [nos/μm²] | | 0.30 | 2.6 | 0.29 | 0.12 | 0.12 | 0.12 |
| M40 [nos/μm²] | | 0.04 | 0.05 | 0.01 | 0.01 | 0.01 | 0.01 |
| L10/M20 | | 0.1 | 0.008 | 0.103 | 0.67 | 0.67 | 0.67 |
| Micro Stiff. [mmg] | MD | 110 | 110 | 125 | 125 | 40 | 40 |
|  | TD | 64 | 64 | 80 | 80 | 25 | 25 |
| (a) | | 2 | 2 | 2 | 2 | 2 | 2 |
| (b) | | 1.25 | 1.25 | 1.25 | 1.65 | 1.65 | 1.65 |
| (c) | | 0.4 | 0.01 | 0.8 | 1.8 | 0.6 | 1.0 |
| (d) | | 1.3 | 0.02 | 2.0 | 4.0 | 1.8 | 3.0 |
| 7M Output (dB) | | 4.0 | 2.0 | 6.2 | 6.4 | 5.2 | 6.2 |
| Still | | more than 2 hrs. | more than 2 hrs. | more than 2 hrs. | more than 2 hrs. | more than 2 hrs. | more than 2 hrs. |
| Mag μ value | 1 P | 0.14 | 0.13 | 0.25 | 0.29 | 0.27 | 0.28 |
|  | 100 P | 0.14 | 0.13 | 0.25 | 0.31 | 0.27 | 0.29 |
|  | Rise | none | none | none | none | none | none |

TABLE 5

|  |  | Ex 8 | C. Ex 10 | Ex 9 | Ex 10 | Ex 11 |
|---|---|---|---|---|---|---|
| $K_t$ [nos/μm²] |  | 0.75 | 0.75 | 0.15 | 0.15 | 1.00 |
| K10 [nos/μm²] |  | 0.08 | 0.08 | 0.05 | 0.07 | 0.2 |
| M20 [nos/μm²] |  | 0.12 | 0.12 | 0.28 | 0.12 | 1.67 |
| M40 [nos/μm²] |  | 0.01 | 0.01 | 0.01 | 0.01 | 0.03 |
| K10/M20 |  | 0.67 | 0.67 | 0.179 | 0.58 | 0.11 |
| Micro | MD | 110 | 110 | 110 | 110 | 110 |
| Stiffness | TD | 60 | 60 | 60 | 60 | 60 |
| [mmg] |  |  |  |  |  |  |
| (a) |  | 1.5 | 1.0 | 2 | 2 | 2.5 |
| (b) |  | 1.65 | 1.65 | 0.7 | 0.7 | 2.2 |
| (c) |  | 1.2 | 1.5 | 0.2 | 0.5 | 0.8 |
| (d) |  | 3.1 | 3.2 | 0.8 | 0.9 | 2.5 |
| 7M Output (dB) |  | 6.3 | 6.4 | 6.1 | 6.0 | 4.5 |
| Still |  | more than 2 hrs. | 70 min. | more than 2 hrs. | 90 min. | more than 2 hrs. |
| Mag μ | 1 P | 0.29 | 0.31 | 0.25 | 0.30 | 0.28 |
| Value | 100 P | 0.31 | 0.33 | 0.25 | 0.34 | 0.30 |
|  | Rise | none | none | none | slight | none |

In the above tables:
Ex: Example; C. Ex: Comparative Example
(a): Reovibron dynamic viscoelastic modulus at 30° C. Ell dyne/cm².
(b): Steel ball abrasion 5° C. 80% E-5 (mm³)
(c): Virgin $H_w$ at 5° C. 80% RH (μm/2 hours)
(d): Repeated $H_w$ (μm/2 hours)

As is apparent from the results of Tables 2 to 5, the magnetic recording media of this invention have a high reproducing output, show low lowering of the output after repeatedly running, and have good head abrasion resistance and running durability. On the other hand, it can be seen that in comparative examples, any one of the magnetic characteristics, the head abrasion resistance, and the running durability is inferior.

[Effect of the Invention]

According to the present invention, a magnetic recording medium having the good magnetic characteristics, the improved heat abrasion resistance, and the excellent running durability can be provided.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a flexible non-magnetic support having on at least one surface thereof a magnetic layer comprising a ferromagnetic powder dispersed in a binder resin, wherein said magnetic layer contains therein an abrasive selected from the group consisting of $Al_2O_3$, $Cr_2O_3$, SiC and mixtures thereof, projections composed of the abrasive (abrasive projections) and projections (non-abrasive projections) composed of other components than the abrasive are distributed on the surface of the magnetic layer, and when the existing density of the abrasive projections is Kt, the existing density of the projections having the heights from the surface of the magnetic layer of from 10 nm to 30 nm in the abrasive projections is K10, the existing density of the projections having the heights from the surface of the magnetic layer of from 20 nm to 100 nm in the non-abrasive projections is M20, and the existing density of the projections having the heights from the surface of the magnetic layer of from 40 nm to 100 nm in the non-abrasive projections is M40, they satisfy the following relations;

$0.1 \leq Kt \leq 1.0$ (numbers/μm²)
$0.01 \leq K10 \leq 0.2$ (numbers/μm²)
$0.03 \leq M20 \leq 2.2$ (numbers/μm²)
$M40 \leq 0.03$ (numbers/μm²)
$0.005 \leq K10/M20 \leq 1.0$.

2. The magnetic recording medium as in claim 1, wherein the abrasive has an average primary particle size of from 0.05 to 0.25 μm.

3. The magnetic recording medium as in claim 2, wherein the abrasive is added in an amount of from 2.5 to 12.5 parts by weight per 100 parts by weight of the ferromagnetic powder.

4. The magnetic recording medium as in claim 1, wherein the magnetic recording medium is a magnetic tape and a ratio of (stiffness in the lengthwise direction)/(stiffness in the width direction) is from 0.7 to 2.0.

5. The magnetic recording medium as in claim 4, wherein the stiffness of the magnetic recording tape in the width direction is from 35 to 70 mm.g.

6. The magnetic recording medium as in claim 4, wherein the stiffness of the magnetic recording tape in the width direction is from 35 to 65 mm.g.

7. The magnetic recording medium as in claim 6, wherein a ratio of (stiffness in the lengthwise direction)/(stiffness in the width direction) is from 1.5 to 2.0.

8. The magnetic recording medium as in claim 1, wherein the ferromagnetic powder is a ferromagnetic metal powder.

9. The magnetic recording medium as in claim 8, wherein the ferromagnetic metal powder is α-Fe; has a content of Ni atom to the Fe atom of from $5 \times 10^{-4}$ to 0.4 atomic %, a content of Mg atom to the Fe atom of from 0.2 to 1.5 atomic %, a content of Al atom to the Fe atom of from 4 to 15 atomic %, a content of rare earth element to the Fe atom of from 0.1 to 10 atomic %, a content of Si atom to the Fe atom of from $5 \times 10^{-4}$ to 1.5 atomic %, and a content of Co atom to the Fe atom of from 5 to 35 atomic %.

10. The magnetic recording medium as in claim 1, wherein the magnetic larger further contains carbon black in an amount of from 0.1 to 10.4 by weight to the amount of the ferromagnetic metal powder.

11. The magnetic recording medium as in claim 10, wherein the carbon black has a specific area of from 5 to 300 m²/g and a DBP oil absorption of from 20 to 150 ml/100 g.

12. The magnetic recording medium as in claim 1, wherein the thickness of the magnetic layer is from 0.1 to 1.0 μm and a non-magnetic layer mainly comprising a non-magnectic powder and a binder resin is disposed between the magnetic layer and the flexible non-magnetic support.

13. The magnetic recording medium as in claim 1, wherein the dynamic viscoelastic modulus of the total coated layers at the magnetic layer side formed on the flexible non-magnectic support at 30° C. is from $1.0 \times 10^{11}$ to $3.0 \times 10^{11}$ dyne/cm².

14. The magnetic recording medium as in claim 1, wherein the magnetic recording medium is a magnetic tape and the stiffness of the magnetic tape in the width direction is from 20 to 70 mm.g.

15. The magnetic recording medium as in claim 1, wherein the Kt is from 0.1 to 0.7, the K10 is from 0.01 to 0.15, the K20 is from 0.05 to 1.2, the M40 is 0.02 or less, and the K10 /M20 is from 0.005 to 0.6.

16. The magnetic recording medium as in claim 1, wherein the Kt is from 0.1 to 0.4, the K10 is from 0.01 to 0.1, the M20 is from 0.1 to 0.6, the M40 is 0.01 or less, and the K10 /M20 is from 0.005 to 0.3.

17. The magnetic recording medium as in claim 1, wherein the Kt is from 0.1 to 0.2, the K10 is from 0.01 to 0.05, the M20 is from 0.1 to 0.6, the M40 is 0.01 or less, and the K10 /M20 is from 0.005 to 0.1.

18. The magnetic recording medium as in claim 1, wherein the abrasive has an average primary particle size of from 0.10 to 0.20 µm, and is added in an amount of from 2.5 to 7.5 parts by weight per 100 parts by weight of the ferromagnetic powder.

* * * * *

UNITED STATES PATENT AND TRADEMARK OFFICE
CERTIFICATE OF CORRECTION

PATENT NO. : 5,718,964
DATED : February 17, 1998
INVENTOR(S) : Koji Naoe et al.

It is certified that error appears in the above-identified patent and that said Letters Patent is hereby corrected as shown below:

On the Title Page

In column 2, after line 2, please insert the following:

--5,512,350    4/1996    Ryoke et al.    428/141--.

In the Claims

In claim 10, line 2, please change "larger" to --layer--.

In claim 10, line 3, please change "10.4" to --10%--.

Signed and Sealed this

Twenty-seventh Day of February, 2001

Attest:

NICHOLAS P. GODICI

Attesting Officer

Acting Director of the United States Patent and Trademark Office